(12) United States Patent
Miller et al.

(10) Patent No.: US 12,210,856 B2
(45) Date of Patent: *Jan. 28, 2025

(54) DYNAMIC CODE MANAGEMENT

(71) Applicant: LIVEPERSON, INC., New York, NY (US)

(72) Inventors: Grant Lawrence Miller, Los Angeles, CA (US); Marc Campbell, Los Angeles, CA (US)

(73) Assignee: LIVEPERSON, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/941,158

(22) Filed: Sep. 9, 2022

(65) Prior Publication Data

US 2023/0134632 A1 May 4, 2023

Related U.S. Application Data

(63) Continuation of application No. 17/063,270, filed on Oct. 5, 2020, now Pat. No. 11,481,199, which is a
(Continued)

(51) Int. Cl.
*G06F 16/958* (2019.01)
*G06F 8/41* (2018.01)
*G06F 16/957* (2019.01)

(52) U.S. Cl.
CPC .......... *G06F 8/447* (2013.01); *G06F 16/9577* (2019.01); *G06F 16/958* (2019.01); *G06F 16/972* (2019.01)

(58) Field of Classification Search
CPC ...... G06F 8/447; G06F 16/958; G06F 16/972; G06F 16/9577
See application file for complete search history.

(56) References Cited

U.S. PATENT DOCUMENTS

| 6,748,588 B1 | 6/2004 | Fraser et al. |
| 7,200,809 B1 | 4/2007 | Paul et al. |

(Continued)

FOREIGN PATENT DOCUMENTS

| EP | 1641211 | 3/2006 |
| WO | 2016040494 | 3/2016 |

OTHER PUBLICATIONS

U.S. Appl. No. 14/849,396, "Non-Final Office Action", Jun. 3, 2016, 18 pages.
(Continued)

*Primary Examiner* — Ziaul A Chowdhury
(74) *Attorney, Agent, or Firm* — POLSINELLI LLP

(57) ABSTRACT

Systems and methods for performing dynamic code management, such as dynamic management of JavaScript tags in webpages or code segments in native applications, are disclosed. A user device loading a web or native application can access a factor, such as a user device-specific attribute or a piece of content of the webpage or native application being loaded. That factor can be applied to a rule that is evaluated (e.g., by the user device or a code server) to select one or more desired segments of code (e.g., JavaScript tags or native application code) to be executed by the user device from a pool of available code (e.g., pre-embedded code or dynamically injected code).

12 Claims, 20 Drawing Sheets

Related U.S. Application Data continuation of application No. 15/595,492, filed on May 15, 2017, now Pat. No. 10,831,459, which is a continuation of application No. 14/849,396, filed on Sep. 9, 2015, now Pat. No. 9,772,829.

(60) Provisional application No. 62/048,022, filed on Sep. 9, 2014.

(56) References Cited

U.S. PATENT DOCUMENTS

| | | | |
|---|---|---|---|
| 7,206,647 | B2 | 4/2007 | Kumar |
| 8,438,473 | B2 | 5/2013 | Mak |
| 8,869,019 | B1 | 10/2014 | Sampath-Kumar et al. |
| 9,262,058 | B2 | 2/2016 | Mubarek |
| 9,280,677 | B1* | 3/2016 | Perry ............ H04L 67/10 |
| 9,384,346 | B1* | 7/2016 | Dayan ............ G06F 21/53 |
| 9,489,190 | B1* | 11/2016 | Wang ............ G06F 8/65 |
| 9,558,288 | B1 | 1/2017 | Boswell et al. |
| 9,645,980 | B1* | 5/2017 | Kim ............ G06F 40/197 |
| 9,772,829 | B2 | 9/2017 | Miller et al. |
| 10,474,735 | B2 | 11/2019 | DeLoach |
| 10,831,459 | B2 | 11/2020 | Miller et al. |
| 11,481,199 | B2 | 10/2022 | Miller et al. |
| 2005/0015365 | A1 | 1/2005 | Kavacheri et al. |
| 2005/0246635 | A1 | 11/2005 | Hirose et al. |
| 2007/0061486 | A1 | 3/2007 | Trinh et al. |
| 2009/0070413 | A1 | 3/2009 | Priyadarshan |
| 2009/0305682 | A1 | 12/2009 | Spalink |
| 2010/0057581 | A1 | 3/2010 | Narayanaswami |
| 2010/0180192 | A1 | 7/2010 | Hall et al. |
| 2010/0205024 | A1 | 8/2010 | Shacha |
| 2010/0318892 | A1 | 12/2010 | Teevan et al. |
| 2010/0325607 | A1 | 12/2010 | Meijer et al. |
| 2011/0125594 | A1 | 5/2011 | Brown |
| 2011/0197156 | A1 | 8/2011 | Strait |
| 2011/0271175 | A1 | 11/2011 | Lavi et al. |
| 2012/0011431 | A1 | 1/2012 | Mao |
| 2012/0042232 | A1 | 2/2012 | Brelsford |
| 2012/0072488 | A1 | 3/2012 | Manion et al. |
| 2012/0166609 | A1 | 6/2012 | Lux |
| 2012/0254853 | A1 | 10/2012 | Aggarwal et al. |
| 2012/0266101 | A1 | 10/2012 | Shah |
| 2012/0297288 | A1 | 11/2012 | Mansouri |
| 2013/0021381 | A1 | 1/2013 | Zhang |
| 2013/0036351 | A1 | 2/2013 | King et al. |
| 2014/0019844 | A1 | 1/2014 | Rakow |
| 2014/0052576 | A1 | 2/2014 | Zelenka |
| 2014/0068589 | A1* | 3/2014 | Barak ............ G06F 9/445 717/176 |
| 2014/0075287 | A1 | 3/2014 | Scoda |
| 2014/0157380 | A1 | 6/2014 | Abrams et al. |
| 2014/0237378 | A1 | 8/2014 | Gonen |
| 2014/0281904 | A1 | 9/2014 | Burckart et al. |
| 2014/0300643 | A1 | 10/2014 | Urosev |
| 2014/0310742 | A1 | 10/2014 | Kim |
| 2014/0380137 | A1 | 12/2014 | Zhang et al. |
| 2015/0040098 | A1 | 2/2015 | Akins et al. |
| 2015/0067589 | A1 | 3/2015 | Xiao |
| 2015/0089475 | A1* | 3/2015 | Geng ............ G06F 16/93 717/121 |
| 2015/0180946 | A1 | 6/2015 | Mellamphy et al. |
| 2015/0309993 | A1 | 10/2015 | Wilde |
| 2016/0026716 | A1 | 1/2016 | Yeager |
| 2016/0070551 | A1 | 3/2016 | Miller et al. |
| 2017/0123635 | A1 | 5/2017 | Zhang |
| 2018/0173393 | A1 | 6/2018 | Verdier |

OTHER PUBLICATIONS

U.S. Appl. No. 14/849,396, "Notice of Allowance", Feb. 14, 2017, 11 pages.

Buttler et al., "Device Independence and the Web", [Retrieved from Internet on Feb. 1, 2017], <http://www.hpl.hp.com/research/papers/2003/device_independence.pdf>, 2002, pp. 1-10.

Charland et al., "Mobile application development", Web vs. Native, Communications of the ACM, vol. 54 Issue 5, May 2011, 49-53 Pages.

PCT/US2015/049204 , "International Search Report and Written Opinion", Nov. 23, 2015, 15 pages.

Retrieved From Internet on Feb. 1 et al., "Evaluating Web Accessibility for Specific Mobile Devices", Retrieved from Internet on Feb. 1, 2017], <https://pdfs.semanticscholar.org/8fcf/2683e22cec2ae5008417e27c48b831e33d20.pdf>, 2008, pp. 65-72.

SMUS , "A non-responsive approach to building cross-device webapps-HTML5 Rocks", http://www.html5rocks.com/en/mobile/cross-device/, Apr. 24, 2012, 12 pages.

Vander et al., "Extracting and Evolving Mobile Games Product Lines", Retrieved from Internet on Feb. 1, 2017 <http://citeseerx.ist.psu.edu/viewdoc/download?doi=10.1.1.91.9134&rep=repl&type=pdf>, 2005, pp. 70-81.

A. Roudaki,J.Kong et al., "A classification of webbrowsing on mobile devices", [Online], pp. 82-98, [Retrieved from Interent on Jun. 22, 2020], <https://www.sciencedirect.com/science/article/pii/S1045926X14001505>, (Year: 2014).

Louis-Pierre Berge et al., "Exploring Smartphone-Based Interaction with Overview+Detail Interfaces on 3D Public Displays", [Online], pp. 125-134, [Retrieved from Internet on Jun. 22, 2020], <https://dl.acm.org/doi/pdf/10.1145/2628363.2628374> (Year: 2014).

Michael Nebeling et al., "W3Touch: Metrics-based Web Page Adaptation for Touch", [Online], pp. 2311-2320, [Retrieved from Interent on Jun. 22, 2020], <https://dl.acm.org/doi/pdf/10.1145/2470654.2481319>, (Year: 2013).

Patrick Baudisch et al., "Collapse-to-Zoom: Viewing Web Pages on Small Screen Devices by Interactively Removing Irrelevant Content", [Online], pp. 91-94, [Retrieved from Interent on Jun. 22, 2020], <https://dl.acm.org/doi/pdf/10.1145/1029632.1029647> (Year: 2004).

U.S. Appl. No. 15/595,492, "Final Office Action", Dec. 13, 2019, 21 pages.

U.S. Appl. No. 15/595,492, "Notice of Allowance", Jul. 7, 2020, 8 pages.

U.S. Appl. No. 17/063,270, "Non-Final Office Action", Oct. 15, 2021, 8 pages.

U.S. Appl. No. 17/063,270, "Notice of Allowance", Jun. 23, 2022, 16 pages.

* cited by examiner

DYNAMIC CODE MANAGEMENT

CROSS REFERENCE TO RELATED APPLICATIONS

This application is a continuation of U.S. application Ser. No. 17/063,270 filed Oct. 5, 2020, which is a continuation of U.S. application Ser. No. 15/595,492 filed May 15, 2017, which is a continuation of U.S. application Ser. No. 14/849,396 filed Sep. 9, 2015, which claims priority to U.S. Provisional Application No. 62/048,022, filed Sep. 9, 2014, the disclosure of each of which is incorporated herein by reference in its entirety for all purposes.

TECHNICAL FIELD

The present disclosure relates to internet-enabled applications generally and more specifically to device-specific and/or other factor-specific application deployment.

BRIEF DESCRIPTION OF THE DRAWINGS

The specification makes reference to the following appended figures, in which use of like reference numerals in different figures is intended to illustrate like or analogous components.

Figure 1:
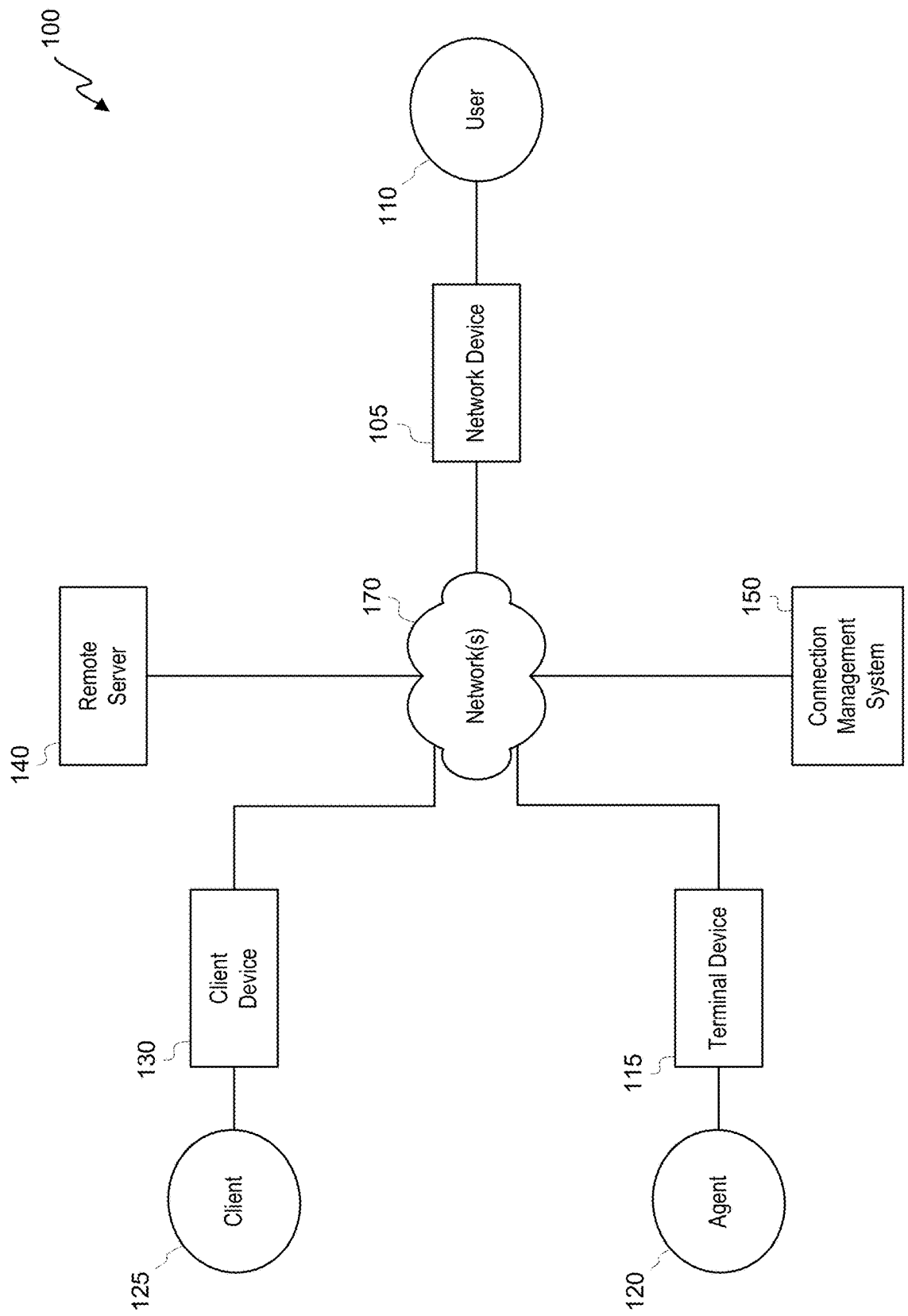
FIG. 1 shows a block diagram of an embodiment of a network interaction system.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Certain aspects and features of the present disclosure relate to systems and method for performing dynamic code management, such as dynamic management of JavaScript tags in webpages or code segments in native applications. In some embodiments, an electronic device (e.g., a user device) loading a webpage or a native application will access a factor, such as a user device-specific attribute, a piece of content of the webpage being loaded, or a piece of content of the native application being loaded (e.g., a customer identifier embedded in the native application). A rule can be determined (e.g., by being accessed and/or executed by a user device or a server). The factor can be applied to the rule to determine one or more desired segments of web code (e.g., JavaScript tags) or native application code to be executed by the user device. In some cases, the factor can be transmitted to a remote server, which determines the rule and applies the rule to the factor. The remote server can return instructions or code, which when received by the device can be executed to perform specific functions, present specific versions of an application (e.g., web application or native application), or select specific code segments of the web code or native application to be executed next. These aspects and features can be used to customize applications running on websites and native applications based on factors (e.g., available features) of the user device. Rules (e.g., stored in a remote server) can be updated on demand by a client (e.g., website or native application publisher) or service provider (e.g., provider of a web application or extension of a native application, such as a provider of a chat application embedded in a website or native application), thus allowing customization without modification or republishing of the underlying website code or native application code.

Web code can include any piece of code executable by the user device. Web code can be any script executable by a user device. Web code can be any JavaScript tag executable by the user device. Web code can further refer to a portion of or the entirety of a web application embeddable (e.g., statically or dynamically) in a website. Web code can refer to any code embedded (e.g., statically or dynamically) in a website and executable on a client computer. As used herein, web code does not refer to hypertext markup language (HTML).

In some embodiments, the supplier of web code, such as a supplier of a web application, can develop multiple pieces of web code targeted for different environments and/or situations. For example, a first piece of web code can present a first web application designed for and usable on a first style of mobile device, a second piece of web code can present a second web application designed for and usable on a second style of mobile device, and a third piece of web code can present a third web application designed for and usable on a desktop device. Each web application can take advantage of certain hardware and software features of the devices for which they are designed. In these embodiments, user device-specific attributes can be accessed while the webpage is loading and can be used while evaluating a rule in order to determine which piece of web code to execute and thereby which web application to present to the user. Example user device-specific attributes can include information indicative of any attributes specific to the user device accessing the webpage, including the type of device (e.g., phone, tablet, desktop, laptop, or other), model of device, browser used by the device, supported versions of software (e.g., supported HTML and/or supported JavaScript versions), supported screen size of the device, user-specific attributes (e.g., user settings on the user's device, such as the desire for a certain web application to be presented instead of another web application, where available), or other attributes or attribute-indicators specific to the user device. The user device-specific attribute can be used as described herein in order to determine which piece of web code to execute on the user device (e.g., which web application to present to the user).

In some embodiments, the user device-specific attribute can be obtained by parsing or otherwise accessing a user agent string. For example, the user agent string can include information related to the browser used by the user device, which can be used to infer the type or other attributes of the user device (e.g., by comparing the browser and version with a database of possible browsers and versions).

In some embodiments, the factor can be based on the content of the webpage. Content of the webpage can include visible and non-visible information included in the webpage, such as company names, customer identification information (e.g., a customer identification number, or "Customer ID"), words, images, and other webpage elements. Examples of content of the webpage can include the sizes of screen elements, developer (e.g., webpage developer) enabled or disabled features (e.g., disabling pinch and zoom functionality, such as through a viewport element), visible or non-visible elements containing Customer ID, text elements (e.g., a title or header), or other tags or elements on the webpage. The content of the webpage can be accessed by the user device while the webpage is loading and can be used as described herein in order to determine which piece of web code to execute on the user device (e.g., which web application to present to the user).

For example, a particular version of a web application can be presented when the pinch and zoom functionality is disabled, whereas a different version of the web application can be presented when the pinch and zoom functionality is enabled. In another example, a full version of the web application can be presented when a specific Customer ID is present on the webpage (e.g., the Customer ID can be compared to a database on a code server, as described in further detail herein, to determine whether that customer is permitted access to a full version of the web application), but a partial version of the web application or another piece of web code can be presented when the specific Customer ID is not present on the webpage. In such examples, a web application supplier can dynamically change which versions of a web application are available and injectable into a customer's website simply by updating permissions on a code server or by updating dynamic code on the code server. In some embodiments, different versions of the web application can include stable releases and beta releases. In further examples, a factor that includes the presence or absence of a particular element on a webpage (e.g., attribution statement for the web application supplier) can be used to determine whether or not the full web application is presented to the user. In such examples, a full web application could be provided only when the customer properly includes a required attribution statement on the customer's website. In such examples, if a customer were trying to make use of the web application without properly including the attribution statement, the web application would not be presented. Other uses are possible. Different versions of a web application can include different visual element (e.g., graphics and windows), different input options (e.g., buttons and fields), as well as entirely different functionality and other differences.

In some embodiments, the webpage being loaded can include all possible pieces of web code that can be executed ("available code"), as well as all web code necessary to access the factor and determine the desired web code to be executed based on the factor and a rule. As used herein, the term available code includes possible pieces of web code that can be executed, where each piece of web code can be a unique web application or a portion or element of a web application.

In some embodiments, a single JavaScript tag can include code that contains available code (e.g., multiple web applications, such as multiple versions of a single web application or multiple, separate applications) and enabling code. The enabling code can enable the user device to access a factor that is a user device-specific attribute indicative of the type of device (e.g., mobile device or non-mobile desktop device). The enabling code can also include one or more rules that can be evaluated based on the factor to determine which pieces of available code should be executed (e.g., the desired web code). Evaluating the one or more rules can result in the selection of the desired web code, which would then be executed on the user device. For example, when a user device that is a smart phone loads a particular webpage containing a single JavaScript tag as described above, the user device can end up executing desired web code that presents a mobile version of a chat room web application. When a desktop computer loads the same webpage containing the same single JavaScript tag, the user device can end up executing different desired web code, which presents a desktop version of the chat room web application. In some embodiments, both available code and enabling code can be embedded in multiple JavaScript tags in a single webpage.

In some embodiments, a webpage can contain a contain a static tag that causes dynamic code to be injected into the website from a code server. As used herein, the term "injection" includes downloading or otherwise accessing code from a code server and executing at least a portion of the code while the webpage is loading. In some embodiments, the dynamic code can contain available code and enabling code. In some embodiments, the static tag contains enabling code that includes code to access the factor and contains one or more rules. In some embodiments, the dynamic code that is injected while the webpage is loading contains available code that includes non-desired code, which may end up not being executed on the user device due to not being selected when the rule is evaluated.

In some embodiments, the static tag contains code sufficient to access the factor and transmit the factor to a code server. In such embodiments, the code server can evaluate the rule based on the factor and determine the desired code to be executed. The code server can then provide dynamic code to the user device that includes only the desired web code. In other words, in such an embodiment, only the code that would actually be executed on the user device is injected when the webpage loads.

In some embodiments, rules can be based on the factors and can denote which piece of web code, out of all available code, should be executed by the user device. For example, a rule can be set up such that if a factor is presented that indicates the user device is a desktop computer, a first piece of web code can be selected to be executed by the user device. The same rule or a different rule can be set up such that if the factor presented indicates that the user device is a tablet, a second piece of web code can be selected to be executed by the user device. In some embodiments, a rule can include multiple sub-rules and/or can include the evaluation of multiple factors. Other types of rules can be used.

Use of the systems and methods described herein can enable a web application supplier to easily update web applications by updating the code stored in a single location (e.g., a code server). Additionally, a web application supplier can quickly update the specific version of the web application used for a particular device (e.g., for a mobile phone) or that is used in a particular environment (e.g., for use with pinch and zoom disabled webpages) quickly and easily from a single location (e.g., a code server). The systems and methods disclosed herein can allow a web developer to include multiple versions of a web application in a single webpage, without needing to redirect the user's web browser to another page and without needing the user to interact with the webpage other than simply loading the webpage.

In some cases, dynamic code management can be performed in a native application (e.g., as opposed to a web application run through a web browser). When run in a native application, a segment of code can access a factor, such as a user device-specific attribute or a piece of content of the application being run. A rule can be determined (e.g., by being accessed from a remote server and/or executed by a remote server). The factor can be applied to the rule to determine one or more desired segments of code (e.g., segments of code of the native application) to be executed by the user device. In some cases, the factor can be transmitted to a remote server in order for the server to determine and apply the rule. The remote server can transmit instructions or code back to the native application running on the user device, which when executed cause the native application to execute one or more desired segments of code (e.g., existing code in the native application).

Certain aspects and features of the present disclosure also relate to methods, systems, and computer-program products for optimizing internet applications, such as internet chat application, for use on devices having various screen sizes. In particular, the present disclosure can provide a chat or other functionality on a website loaded on a device, such as a mobile device, wherein an interaction window (e.g., chat window) is optimized according to the mobile device's screen and not according to the dimensions of the underlying website. The present disclosure can include changing a viewport tag to identify the site or webpage as non-zoomable whenever the interaction window is displayed, then returning the viewport tag to its original configuration or a default configuration when the interaction window is not displayed.

The ensuing description provides preferred examples of embodiment(s) only and is not intended to limit the scope, applicability or configuration of the disclosure. Rather, the ensuing description of the preferred examples of embodiment(s) will provide those skilled in the art with an enabling description for implementing a preferred examples of embodiment. It is understood that various changes can be made in the function and arrangement of elements without departing from the spirit and scope as set forth in the appended claims.

FIG. 1 shows a block diagram of an embodiment of a network interaction system 100 which implements and supports certain embodiments and features described herein. Certain embodiments relate to establishing a connection channel between a network device 105 (which can be operated by a user 110) and a terminal device 115 (which can be operated by an agent 120). In certain embodiments, the network interaction system 100 can include a client device 130 associated with a client 125.

In certain embodiments, a user 110 can be an individual browsing a web site or accessing an online service provided by a remote server 140. A client 125 can be an entity that provides, operates, or runs the web site or the online service, or individuals employed by or assigned by such an entity to perform the tasks available to a client 125 as described herein. The agent 120 can be an individual, such as a support agent or sales associate tasked with providing support or information to the user 110 regarding the website or online service (e.g., information about products available at an online store). Out of a large number of agents, a subset of agents may be appropriate for providing support or information for a particular client 125. The agent 120 may be affiliated or not affiliated with the client 125. Each agent can be associated with one or more clients 125. In some non-limiting examples, a user 110 can be an individual shopping an online store from a personal computing device, a client 125 can be a company that sells products online, and an agent 120 can be a sales associate employed by the company. In various embodiments, the user 110, client 125, and agent 120 can be other individuals or entities.

While FIG. 1 shows only a single network device 105, terminal device 115 and client device 130, an interaction system 100 can include multiple or many (e.g., tens, hundreds or thousands) of each of one or more of these types of devices. Similarly, while FIG. 1 shows only a single user 110, agent 120 and client 125, an interaction system 100 can include multiple or many of each of one or more of such entities. Thus, it may be necessary to determine which terminal device is to be selected to communicate with a given network device. Further complicating matters, a remote server 140 may also be configured to receive and respond to select network-device communications.

A connection management system 150 can facilitate strategic routing of communications. A communication can include a message with content (e.g., defined based on input from an entity, such as typed or spoken input). The communication can also include additional data, such as data about a transmitting device (e.g., an IP address, account identifier, device type and/or operating system); a destination address; an identifier of a client; an identifier of a webpage or webpage element (e.g., a webpage or webpage element being visited when the communication was generated or otherwise associated with the communication) or online history data; a time (e.g., time of day and/or date);

and/or destination address. Other information can be included in the communication. In some instances, connection management system 150 routes the entire communication to another device. In some instances, connection management system 150 modifies the communication or generates anew communication (e.g., based on the initial communication). The new or modified communication can include the message (or processed version thereof), at least some (or all) of the additional data (e.g., about the transmitting device, webpage or online history and/or time) and/or other data identified by connection management system 150 (e.g., account data associated with a particular account identifier or device). The new or modified communication can include other information as well.

Part of strategic-routing facilitation can include establishing, updating and using one or more connection channels between network device 105 and one or more terminal devices 115. For example, upon receiving a communication from network device 105, connection management system 150 can first estimate to which client (if any) the communication corresponds. Upon identifying a client, connection management system 150 can identify a terminal device 115 associated with the client for communication with network device 105. In some instances, the identification can include evaluating a profile of each of a plurality of agents (or experts or delegates), each agent (e.g., agent 120) in the plurality of agents being associated with a terminal device (e.g., terminal device 115). The evaluation can relate to a content in a network-device message. The identification of the terminal device 115 can include a technique described, for example, in U.S. application Ser. No. 12/725,799, filed on Mar. 17, 2010, which is hereby incorporated by reference in its entirety for all purposes.

In some instances, connection management system 150 can determine whether any connection channels are established between network device 105 and a terminal device associated with the client (or remote server 140) and, if so, whether such channel is to be used to exchange a series of communications including the communication. This determination may depend, at least in part, on a topic associated with the communication, a sentiment score associated with the communication or a past related communication, a predicted (e.g., relative or absolute) response latency for terminal device 115 and/or a type of communication channel associated with the communication (e.g., instant message, message, email, phone). Selecting an established communication channel may promote consistency and reduce the need to relay information from network device 105 multiple times. Meanwhile, determining that a new communication channel is to be established can facilitate quicker responses from more specialized agents.

A decision as to whether to select (or continue to use) an established communication channel and/or a selection of a new terminal device can include determining an extent to which each of one or more terminal devices (e.g., associated with a client) corresponds to a communication and/or an associated the user. Such correspondence can relate to, for example, an extent to which an agent's knowledge base corresponds to a communication topic, an availability of an agent at a given time and/or over a channel type, a language match between a user and agent, and/or a personality analysis.

Connection management system 150 may use communication analyses to influence routing determinations (e.g., determining whether to route a communication to a terminal device having previously received a communication from a network device having transmitted the communication or selecting a terminal device to receive or transmit a communication). One communication analysis can include determining and assessing one or more categories or tags of a current or past communication or communication series. For example, a communication can be assigned a category for each of (for example) a topic, channel type (e.g., email, SMS message, real-time chat, phone call or asynchronous message), language, complexity level, sentiment, and/or whether/which file type is attached, and a terminal-device selection can be biased towards terminal devices associated with similar, same or complementary knowledge bases, channel-type availability, language, skill level, sentiment, and/or file-type capabilities.

In some cases, communication analysis can include determining a factor of a client device 130, as described herein, to determine the client device's 130 capabilities (e.g., whether the device is connected to a high-speed internet connection, whether the device has necessary central processing unit (CPU) or graphical processing unit (GPU) speeds to handle video calls, whether the device has a camera to handle video calls, and others). The communication analysis can include determining and applying a rule based on the factor in order to influence routing determinations.

Upon selecting a terminal device 115 to communicate with network device 105, connection management system 150 can establish a connection channel between the network device 105 and terminal device 115. In some instances, connection management system 150 can transmit a message to the selected terminal device 115. The message may request an acceptance of a proposed assignment to communicate with a network device 105 or identify that such an assignment has been generated. The message can include information about network device 105 (e.g., IP address, device type, and/or operating system), information about an associated user 110 (e.g., language spoken, duration of having interacted with client, skill level, sentiment, and/or topic preferences), a received communication, code (e.g., a clickable hyperlink) for generating and transmitting a communication to the network device 105, and/or an instruction to generate and transmit a communication to network device 105.

In one instance, communications between network device 105 and terminal device 115 can be routed through connection management system 150. Such a configuration can allow connection management system 150 to monitor the communication exchange and to detect issues (e.g., as defined based on rules) such as non-responsiveness of either device or extended latency. Further, such a configuration can facilitate selective or complete storage of communications, which may later be used, for example, to assess a quality of a communication exchange and/or to support learning to update or generate routing rules so as to promote particular post-communication targets. Such storage can also facilitate generation of a message history between a network device and first terminal device, which may be transmitted (for example) to a second terminal device when it is determined that the second terminal device is to join an existing or participate in a new communication series with the network device.

In some embodiments, connection management system 150 can monitor the communication exchange in real-time and perform automated actions (e.g., rule-based actions) based on the live communications. For example, when connection management system 150 determines that a communication relates to a particular product, connection management system 150 can automatically transmit an additional message to terminal device 115 containing additional information about the product (e.g., quantity of products in stock, links to support documents related to the product, or other information about the product or similar products).

In one instance, a designated terminal device 115 can communicate with network device 105 without relaying communications through connection management system 150. One or both devices 105, 115 may (or may not) report particular communication metrics or content to connection management system 150 to facilitate communication monitoring and/or data storage. The communication metrics or content reported to the connection management system 150 can be a factor of the client device 130, as described in further detail herein.

As mentioned, connection management system 150 may route select communications to a remote server 140. Remote server 140 can be configured to provide information in a predetermined manner. For example, remote server 140 may access defined one or more text passages, voice recording and/or files to transmit in response to a communication. Remote server 140 may select a particular text passage, recording or file based on, for example, an analysis of a received communication (e.g., a semantic or mapping analysis).

Routing and/or other determinations or processing performed at connection management system 150 can be performed based on rules and/or data at least partly defined by or provided by one or more client devices 130. For example, client device 130 may transmit a communication that identifies a prioritization of agents, terminal-device types, and/or topic/skill matching. As another example, client device 130 may identify one or more weights to apply to various variables potentially impacting routing determinations (e.g., language compatibility, predicted response time, device type and capabilities, and/or terminal-device load balancing). It will be appreciated that which terminal devices and/or agents are to be associated with a client may be dynamic. Communications from client device 130 and/or terminal devices 115 may provide information indicating that a given terminal device and/or agent is to be added or removed as one associated with a client. For example, client device 130 can transmit a communication with IP address and an indication as to whether a terminal device with the address is to be added or removed from a list identifying client-associated terminal devices.

In one instance, connection management system 150 facilitates an initial match and routing between network device 105 and a first terminal device 115. For example, a message received in a communication from network device 105 can be routed to the first terminal device. As another example, communication management system 150 can transmit a communication to the first terminal device that includes or is indicative of a request or instruction to transmit a communication (e.g., initiating a communication series) to network device 105.

Connection management system 150 can monitor and/or analyze a corresponding communication series between network device 105 and the first terminal device to determine a characteristic. For example, connection management system 150 can analyze message content in one or more communications (e.g., to determine whether and/or how many of particular words, symbols or character types, such as "frustrat*", "very", "thank", or "irritat*", "!" or capital letters, were used). As another example, connection management system 150 can determine one or more statistics pertaining to each of one or more messages and/or the series. Examples of statistics can include, for example, message length (e.g., in words or characters), latency between a receipt of a communication and transmission of a responsive communication, latency between subsequent message transmissions, or typing speed while typing a message. As yet another example, connection management system 150 can receive and process one or more inputs, detected initially at network device 105 or the first terminal device and then identified to connection management system 150. Such inputs can identify, for example, a sentiment, a reroute request, or a resolution stage.

In some cases, the connection management system 150 can receive a factor of a client device 130 indicative of, for example, a sentiment, a reroute request, or a resolution stage. For example, a factor including accelerometer data showing intense shaking of a client device 130 may be indicative of frustration. As another example, a factor including location information of the client device 130 showing proximity to a cashier in a store may be indicative of reaching a particular resolution stage (e.g., desire to purchase a product being discussed). The factor, when received by the connection management system 150, can be applied to a rule in order to determine a particular instruction to send to the client device 130 which when received or executed by the client device 130 may customize the web application or native application running on the client device 130. For example, upon detecting frustration at the connection management system 150, the connection management system 150 can send instructions to cause the application running on the client device 130 to present additional resolution options or present an opportunity for feedback. In another example, upon detecting a particular resolution stage (e.g., indicative of a desire to purchase a product being discussed) at the connection management system 150, the connection management system 150 can send instructions to cause the application running on the client device 130 to present coupon or rebate information or an opportunity to share the purchase on social media networks.

Connection management system 150 can evaluate the characteristic (e.g., characterizing message content, including a statistic or characterizing an input) to determine whether to bias subsequent routing in a particular manner. For example, a continuous-channel rule can include a condition relating to a characteristic that specifies when routing of network-device messages is to be biased towards the first terminal device (which previously participated in a communication exchange with the network device). The rule can be configured such that satisfaction of the condition results in establishment of a continuous channel between the network device and the first terminal device. The continuous channel can allow subsequent messages from the network device to be automatically routed to the first terminal device and/or preferentially routed to the first terminal device. The continuous channel can be configured to persist through multiple communication series. For example, even if a first series of messages are exchanged between the network device and first terminal device on a first day, the channel can bias routing of another message from the network device transmitted on a second day to be routed to the same first terminal device. A magnitude of such bias may depend on, for example, a time since a previous interaction between the network device and first terminal device (e.g., increasing the bias when a past interaction was recent), a total duration of and/or number of communications in a previous message exchange between the network device and first terminal device and/or a number of previous message exchanges between the network device and first terminal device (and/or a cumulative interaction time or count of exchanged messages).

Upon establishing a continuous channel, connection management system 150 can further facilitate presenting a presentation (e.g., notification) at network device 105 so as to alert user 110 that a continuous channel has been established, to identify the first terminal device or associated user and/or to indicate that subsequent messages (e.g., transmitted in association with an identifier of the channel, associated with a particular client, etc.) are to be routed to or to have routing biased towards the first terminal device.

Conversely, connection management system 150 may determine that the characteristic indicates that subsequent messages from network device 105 (e.g., pertaining to a client) are not to be routed to the same first terminal device and/or are to be rerouted. For example, it can be determined that the condition in the continuous-channel rule is not satisfied. Upon such a determination, connection management system 150 can identify a new terminal device to route communications (e.g., pertaining to a client) to from the network device.

In one instance, a continuous-channel rule is configured such that a continuous channel is to be established between a network device and a terminal device following an initial routing of a communication between the two devices. Thus, the continuous channel may serve to facilitate consistent message routing within a single message exchange. In an alternative or same instance, a continuous-channel rule may (also or alternatively) be configured such that a continuous channel is established, maintained or used so as to promote consistent message routing across different message series (e.g., the series being separated in time). Depending on the embodiment, a continuous-channel rule may limit a number of continuous channels that can be provided with respect to a given network device and/or client. For example, a rule may indicate that, for a given network device and client, the network device can only be connected to one (or three or another specified number) terminal devices via continuous channel.

In some instances, connection management system 150 can determine that a re-routing process is to be initiated (e.g., based on satisfaction of a condition in a re-routing rule). The determination can be based on a characteristic (e.g., characterizing message content, including a statistic or characterizing an input). For example, a re-routing rule can be configured such that re-routing is to be initiated upon detecting a characteristic indicative of user frustration or dissatisfaction; detecting a characteristic indicative of a lack of acceptable progress towards a resolution of an issue; detecting unacceptable terminal-device communication statistics (e.g., long response latencies); or detecting that messages are beginning to focus on a new topic.

A re-routing process can include identifying a different terminal device to participate in a communication exchange with network device 105. Such an identification can be based on, for example, a topic associated with the communication, a sentiment score associated with the communication or a past related communication, a predicted (e.g., relative or absolute) response latency for terminal device 115, a type of communication channel associated with the communication (e.g., instant message, message, email, phone), a language match, a type of each of one or more other terminal devices, a capability of one or more other terminal devices, and/or a match of an agent's skill with a network-device communication complexity. A selection of the different terminal device may be performed in a same, similar or different manner as compared to a selection of a first terminal device. For example, determining that a re-routing rule's condition has been satisfied may bias a subsequent terminal-device selection towards devices associated with more senior rankings, broader knowledge bases and/or better language capabilities.

A re-routing process may include transmitting a notification identifying a proposed re-routing to one or more devices, such as network device 105, the first terminal device or the different terminal device. The notification may include an option to accept and/or an option reject the proposed re-routing. The notification may include information about network device 105, the first terminal device and/or the different terminal device and/or an associated party.

To reduce an abrupt transition between terminal devices, connection management system 150 can coordinate an overlap time period. During this time period, each of the first terminal device and the different terminal device can receive one or more communications (or processed versions thereof) from network device 105. For example, a new communication from network device 105 can be duplicated and then routed to each of the first and different terminal device.

In some instances, connection management system 150 can generate a dynamic message chronicle that includes multiple messages from network device 105 and/or from the first terminal device. The chronicle can include, for example, all messages in a communication exchange, all messages routed within a defined time period (e.g., previous 3 minutes), or all messages associated with one or more defined tags or categories. For example, messages pertaining to a particular topic, sentiment (e.g., corresponding to dissatisfaction), or content type (e.g., including a question) can be selected. Connection management system 150 can transmit the dynamic message chronicle to the different terminal device. New messages from network device 105 and/or the first terminal device can further be transmitted to the different terminal device, such that the dynamic message chronicle can be appended with such new messages. Message selection for a dynamic message chronicle and/or whether a dynamic message chronicle is to be provided may also depend on whether re-routing is to occur during a temporally clustered series of messages or between message series.

In some instances, connection management system 150 can determine whether and/or when to stop routing communications to the first terminal device. For example, such routing termination may occur upon detecting a response communication from the different terminal device, after a defined time period has elapsed following transmission of the message chronicle, after detecting an input received at the first terminal device indicating an intent to exit a communication exchange, after detecting an input received at the different terminal device indicating an intent to handle a communication exchange, after detecting an input received at network device 105 requesting the proposed re-routing to the different terminal device be effected, and so on.

Depending on a rule or a reason for initiating a re-routing transfer, the re-routing may include closing a connection channel between network device 105 and the first terminal device (e.g., if a re-routing process was initiated in response to a low user sentiment) and/or establishing a new connection channel between network device 105 and the different terminal device.

Each communication (e.g., between devices, between a device and connection management system 150, between remote server 140 and connection management system 150 or between remote server 140 and a device) can occur over one or more networks 170. Any combination of open or closed networks can be included in the one or more networks 170. Examples of suitable networks include the Internet, a personal area network, a local area network (LAN), a wide area network (WAN), or a wireless local area network (WLAN). Other networks may be suitable as well. The one or more networks 170 can be incorporated entirely within or can include an intranet, an extranet, or a combination thereof. In some instances, a network in the one or more networks 170 includes a short-range communication channel, such as a Bluetooth or a Bluetooth Low Energy channel. In one embodiment, communications between two or more systems and/or devices can be achieved by a secure communications protocol, such as secure sockets layer (SSL) or transport layer security (TLS). In addition, data and/or transactional details may be encrypted based on any convenient, known, or to be developed manner, such as, but not limited to, Data Encryption Standard (DES), Triple DES, Rivest-Shamir-Adleman encryption (RSA), Blowfish encryption, Advanced Encryption Standard (AES), CAST-128, CAST-256, Decorrelated Fast Cipher (DFC), Tiny Encryption Algorithm (TEA), eXtended TEA (XTEA), Corrected Block TEA (XXTEA), and/or RC5, etc.

A network device 105, terminal device 115 and/or client device 130 can include, for example, a portable electronic device (e.g., a smart phone, tablet, laptop computer, or smart wearable device) or a non-portable electronic device (e.g., one or more desktop computers, smart appliances, servers, and/or processors). Connection management system 150 can be separately housed from network, terminal and client devices or may be part of one or more such devices (e.g., via installation of an application on a device). Remote server 140 may be separately housed from each device and connection management system 150 and/or may be part of another device or system. While each device, server and system in FIG. 1 is shown as a single device, it will be appreciated that multiple devices may instead be used. For example, a set of network devices can be used to transmit various communications from a single user, or remote server 140 may include a server stack.

A software agent or application may be installed on and/or executable on a depicted device, system or server. In one instance, the software agent or application is configured such that various depicted elements can act in complementary manners. For example, a software agent on a device can be configured to collect and transmit data about device usage to a separate connection management system, and a software application on the separate connection management system can be configured to receive and process the data.

Figure 2:
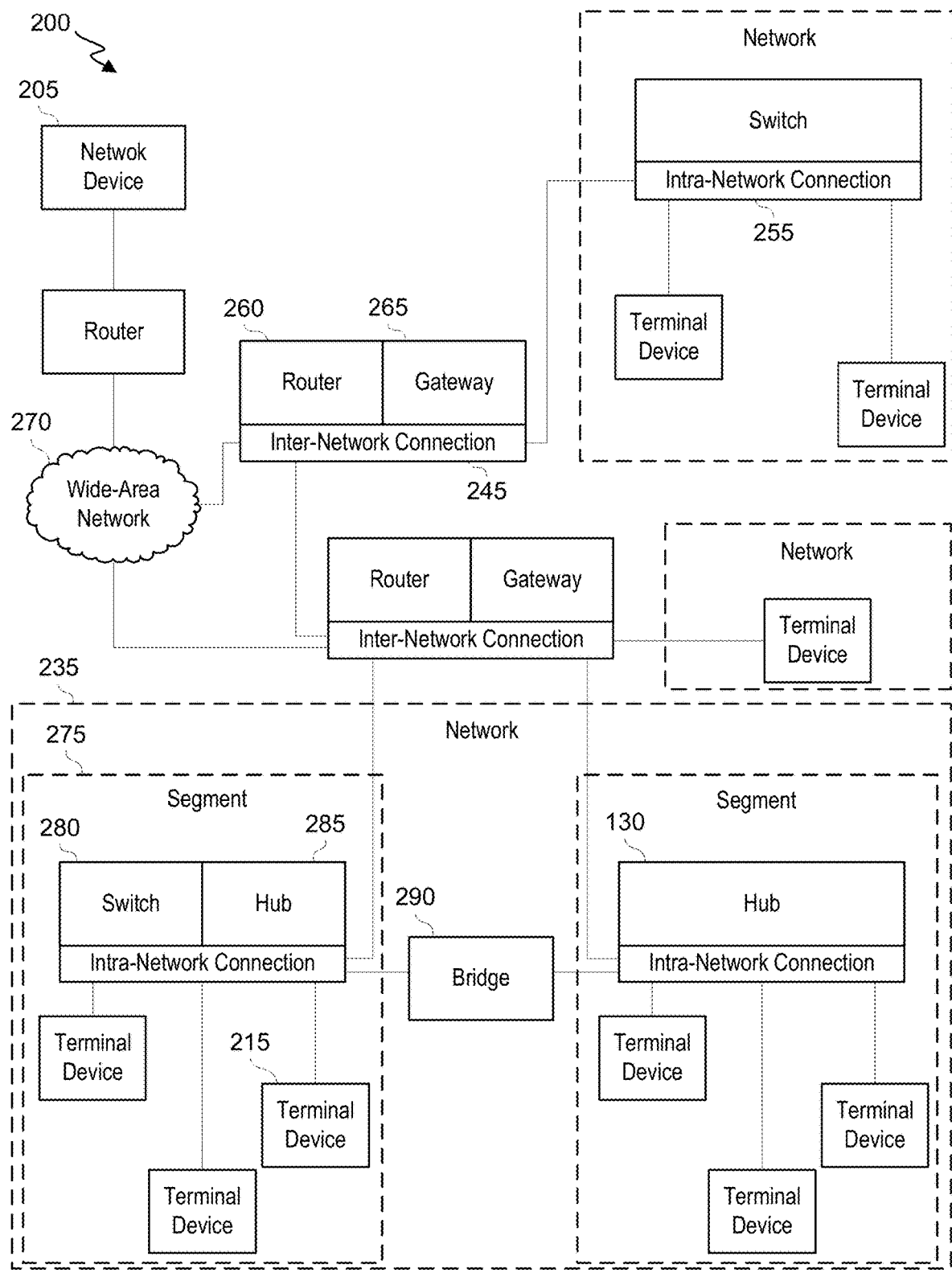
FIG. 2 shows a block diagram of another embodiment of a network interaction system.

FIG. 2 shows a block diagram of another embodiment of a network interaction system 200. Generally, FIG. 2 illustrates a variety of components configured and arranged to enable a network device 205 to communicate with one or more terminal devices 215. The depicted instance includes nine terminal devices 215 included in three local-area networks 235.

In some instances, a communication from network device 205 includes destination data (e.g., a destination IP address) that at least partly or entirely indicates which terminal device is to receive the communication. Network interaction system 200 can include one or more inter-network connection components 240 and/or one or more intra-network connection components 255 that can process the destination data and facilitate appropriate routing.

Each inter-network connection components 245 can be connected to a plurality of networks 235 and can have multiple network cards installed (e.g., each card connected to a different network). For example, an inter-network connection component 245 can be connected to a wide-area network 270 (e.g., the Internet) and one or more local-area networks 235. In the depicted instance, in order for a communication to be transmitted from network device 205 to any of the terminal devices, in the depicted system, the communication must be handled by multiple inter-network connection components 245.

When an inter-network connection component 245 receives a communication (or a set of packets corresponding to the communication), inter-network connection component 245 can determine at least part of a route to pass the communication to a network associated with a destination. The route can be determined using, for example, a routing table (e.g., stored at the router), which can include one or more routes that are pre-defined, generated based on an incoming message (e.g., from another router or from another device) or learned.

Examples of inter-network connection components 245 include a router 260 and a gateway 265. An inter-network connection component 245 (e.g., gateway 265) may be configured to convert between network systems or protocols. For example, gateway 265 may facilitate communication between Transmission Control Protocol/Internet Protocol (TCP/IP) and Internetwork Packet Exchange/Sequenced Packet Exchange (IPX/SPX) devices.

Upon receiving a communication at a local-area network 235, further routing may still need to be performed. Such intra-network routing can be performed via an intra-network connection component 255, such as a switch 280 or hub 285. Each intra-network connection component 255 can be connected to (e.g., wirelessly or wired, such as via an Ethernet cable) multiple terminal devices 215. Hub 285 can be configured to repeat all received communications to each device to which it is connected. Each terminal device can then evaluate each communication to determine whether the terminal device is the destination device or whether the communication is to be ignored. Switch 280 can be configured to selectively direct communications to only the destination terminal device.

In some instances, a local-area network 235 can be divided into multiple segments, each of which can be associated with independent firewalls, security rules and network protocols. An intra-network connection component 255 can be provided in each of one, more or all segments to facilitate intra-segment routing. A bridge 280 can be configured to route communications across segments 275.

To appropriately route communications across or within networks, various components analyze destination data in the communications. For example, such data can indicate which network a communication is to be routed to, which device within a network a communication is to be routed to or which communications a terminal device is to process (versus ignore). However, in some instances, it is not immediately apparent which terminal device (or even which network) is to participate in a communication from a network device.

To illustrate, a set of terminal devices may be configured so as to provide similar types of responsive communications. Thus, it may be expected that a query in a communication from a network device may be responded to in similar manners regardless to which network device the communication is routed. While this assumption may be true at a high level, various details pertaining to terminal devices can give rise to particular routings being advantageous as compared to others. For example, terminal devices in the set may differ from each other with respect to (for example) which communication channels are supported, geographic and/or network proximity to a network device and/or characteristics of associated agents (e.g., knowledge bases, experience, languages spoken, availability, general personality or sentiment, etc.). Accordingly, select routings may facilitate faster responses that more accurately and/or completely respond to a network-device communication. A complication is that static routings mapping network devices to terminal devices may fail to account for variations in communication topics, channel types, agent availability, and so on.

Figure 3A:
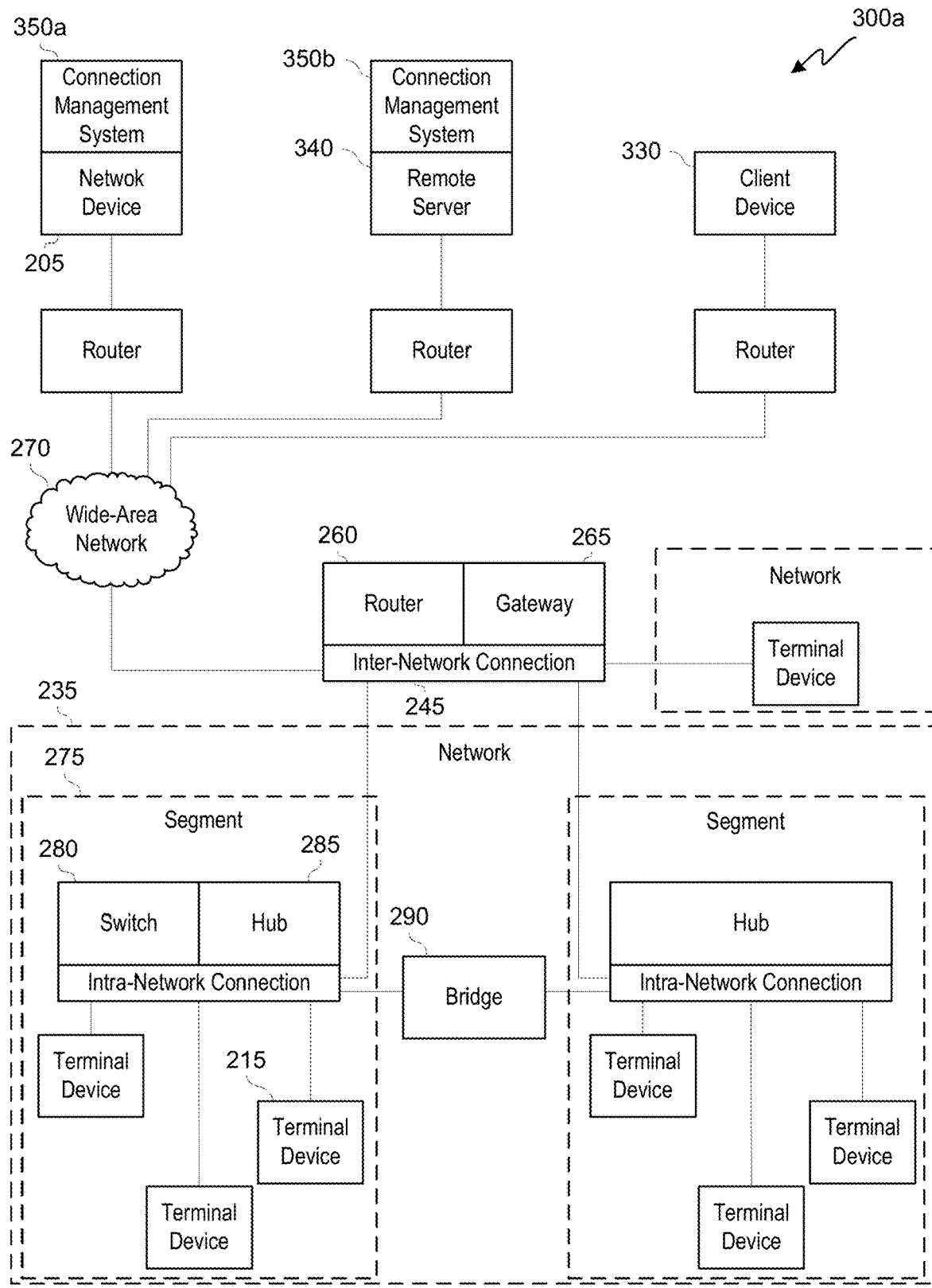
FIGS. 3A-3C show block diagrams of other embodiments of a network interaction system that includes a connection management system.
Figure 3B:
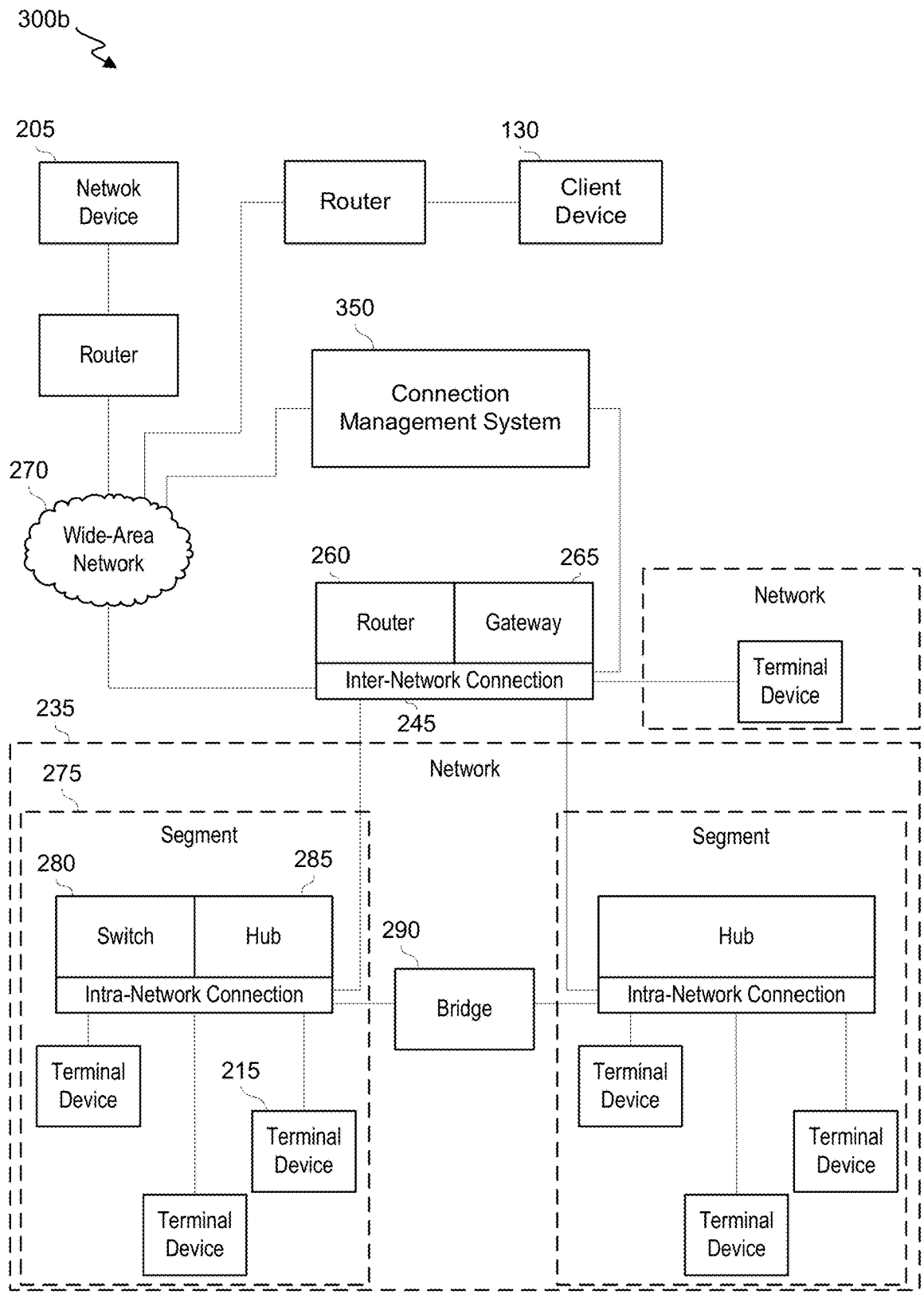
Figure 3C:
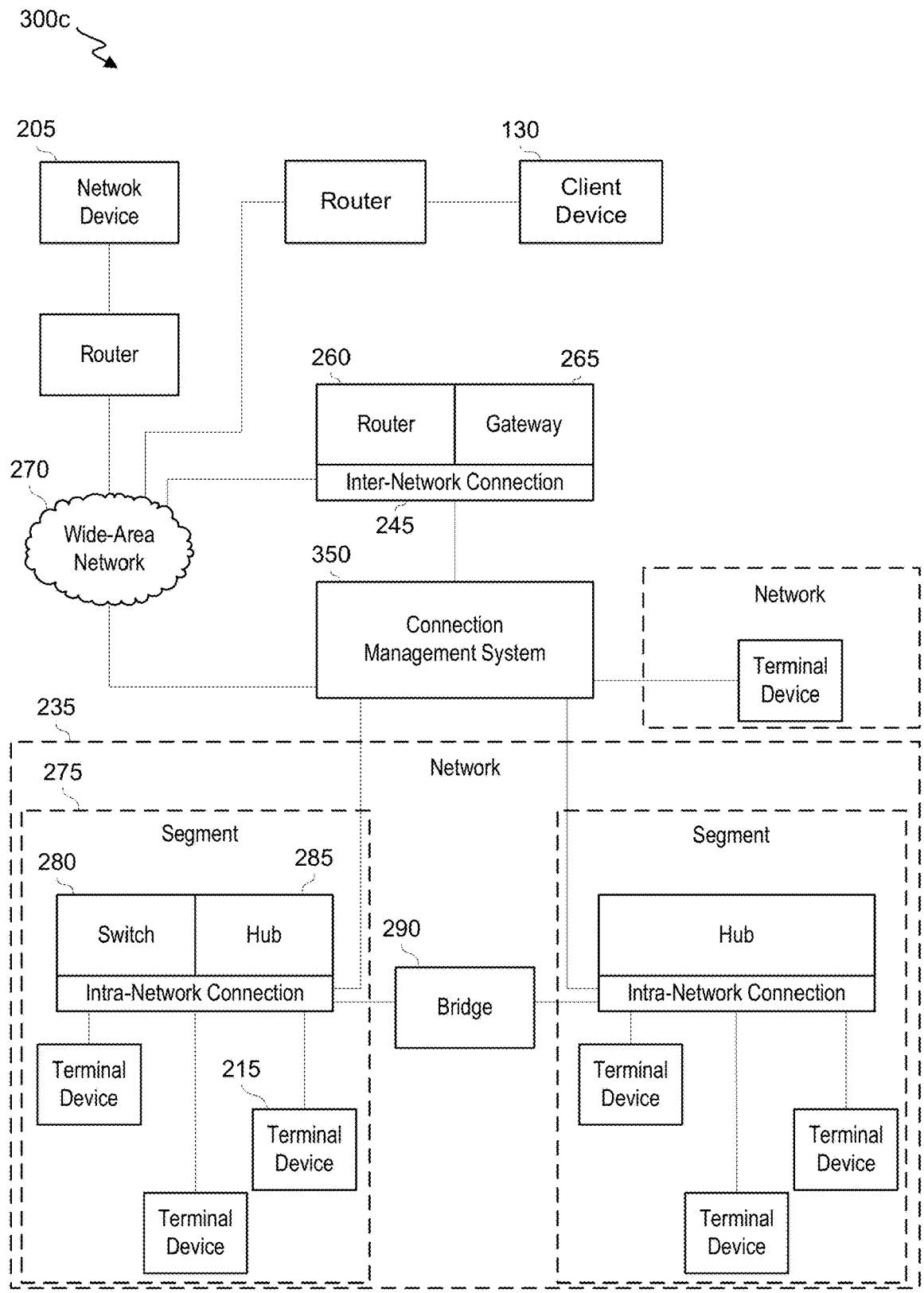

FIGS. 3A-3C show block diagrams of other embodiments of a network interaction system 300a-c that includes a connection management system. Each of the depicted systems 300a-c show only 2 local-area networks 235 for simplicity, though it can be appreciated that embodiments can be extended to expand the number of local-area networks. Each of systems 300a-c include a connection management system 350, which can identify which terminal device is to communicate with network device 205, can establish and manage (e.g., maintain or close) connection channels, can determine whether and when to re-route communications in an exchange, and so on. Thus, connection management system 350 can be configured to dynamically, and in real-time, evaluate communications, agent availability, capabilities of terminal devices or agents, and so on, to influence routing determinations.

In FIG. 3A, connection management system 350 is associated with each of network device 205 and a remote server 340 (e.g., connection management system 350a is associated with network device 205 and connection management system 350b is associated with remote server 340). For example, connection management system 350a and/or connection management system 350b can be installed or stored as an application on each of network device 205 and remote server 340, respectively. Execution of the application(s) can facilitate, for example, a communication between network device 205 and remote server 340 to identify a terminal device 215 selected to participate in a communication exchange with network device 205. The identification can be made based on one or more factors disclosed herein (e.g., availability, matching between a communication's topic/level of detail with agents' or terminal devices' knowledge bases, predicted latency, channel-type availability, and so on).

A client device 330 can provide client data indicating how routing determinations are to be made. For example, such data can include: indications as to how particular characteristics are to be weighted or matched or constraints or biases (e.g., pertaining to load balancing or predicted response latency). Client data can also include specifications related to when communication channels are to be established (or closed) or when communications are to be re-routed to a different network device. Client data can be used to define various client-specific rules, such as rules for communication routing; channel establishment, management or closing; communication re-routing; communication categorization and so on.

Connection management system 350b executing on remote server 340 can monitor various metrics pertaining to terminal devices (e.g., pertaining to a given client), such as which communication channels are supported, geographic and/or network proximity to a network device, communication latency and/or stability with the terminal device, a type of the terminal device, a capability of the terminal device, whether the terminal device (or agent) has communicated with a given network device (or user) before and/or characteristics of associated agents (e.g., knowledge bases, experience, languages spoken, availability, general personality or sentiment, etc.). Accordingly, communication management system 350b may be enabled to select routings to facilitate faster responses that more accurately and/or completely respond to a network-device communication based on the metrics.

In the example depicted in FIG. 3A, a communication exchange between network device 205 and remote server 340 can facilitate early identification of a destination address. Network device 205 may then use the destination address to direct subsequent communications. For example, network device 205 may send an initial communication to remote server 340 (e.g., via one or more inter-network connections and a wide-area network), and remote server 340 may identify one or more corresponding clients. Remote server 340 may then identify a set of terminal devices associated with the one or more corresponding clients and collect metrics for those terminal devices. The metrics can be evaluated (e.g., by remote server 340) so as to select a terminal device to involve in a communication exchange, and information pertaining to the terminal device (e.g., an IP address) can be sent to network device 205. In some embodiments, remote server 340 may continuously or periodically collect and evaluate metrics for various terminal devices and store evaluation results in a data store. In such embodiments, upon identifying a set of terminal devices associated with the one or more corresponding clients, remote server 340 can access the stored evaluation results from the data store and select a terminal device to involve in the communication exchange based on the stored evaluation results.

In FIG. 3B, connection management system 350 can be configured to serve as a relay and/or destination address. Thus, for example, a set of network devices 205 may transmit communications, each identifying connection management system 350 as a destination. Connection management system 350 can receive each communication and can concurrently monitor a set of terminal devices (e.g., so as to generate metrics for each terminal device). Based on the monitoring and a rule, connection management system 350 can identify a terminal device 215 to which it may relay each communication. Depending on the embodiment, terminal device communications may similarly be directed to a consistent destination (e.g., of connection management system 350) for further relaying, or terminal devices may begin communicating directly with corresponding network devices. These embodiments can facilitate efficient routing and thorough communication monitoring.

The embodiment depicted in FIG. 3C is similar to that in FIG. 3B. However, in some embodiments, connection management system 350 is directly connected to intra-network components (e.g., terminal devices, intra-network connections, or other).

It will be appreciated that many variations of FIGS. 3A-3C are contemplated. For example, connection management system 350 may be associated with a connection component (e.g., inter-network connection component 245 or intra-network connection component 255) such that an application corresponding to connection management system 350 (or part thereof) is installed on the component. The application may, for example, perform independently or by communicating with one or more similar or complementary applications (e.g., executing on one or more other components, network devices or remotes servers).

Figure 4:
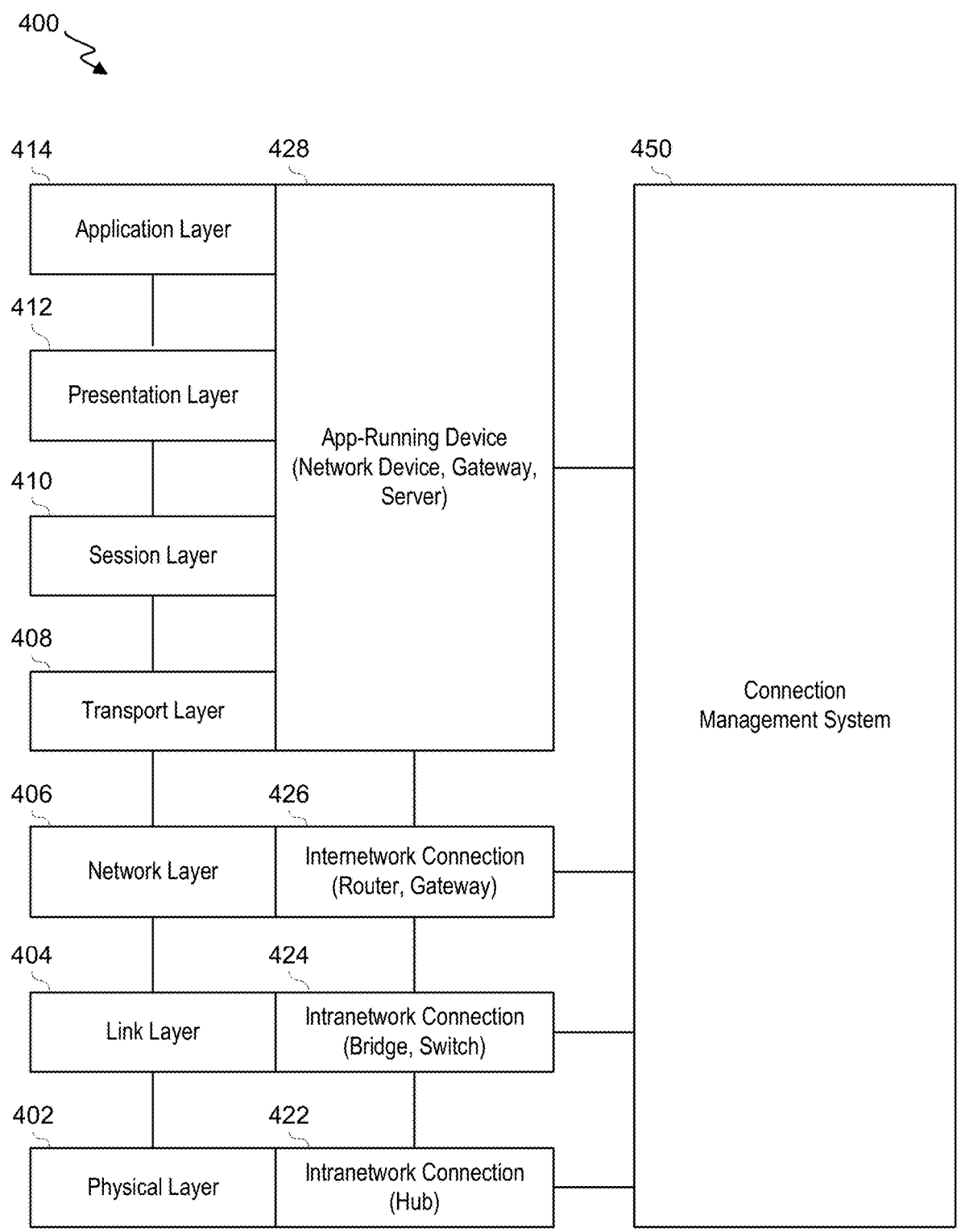
FIG. 4 shows a representation of a protocol-stack mapping of connection components' operation.

FIG. 4 shows a representation of a protocol-stack mapping 400 of connection components' operation. More specifically, FIG. 4 identifies a layer of operation in an Open Systems Interaction (OSI) model that corresponds to various connection components.

The OSI model can include multiple logical layers 402-414. The layers are arranged in an ordered stack, such that layers 402-412 each serve a higher level and layers 404-414 is each served by a lower layer. The OSI model includes a physical layer 402. Physical layer 402 can define parameters physical communication (e.g., electrical, optical, or electromagnetic). Physical layer 402 also defines connection management protocols, such as protocols to establish and close connections. Physical layer 402 can further define a flow-control protocol and a transmission mode.

A link layer 404 can manage node-to-node communications. Link layer 404 can detect and correct errors (e.g., transmission errors in the physical layer 402) and manage access permissions. Link layer 404 can include a media access control (MAC) layer and logical link control (LLC) layer.

A network layer 406 can coordinate transferring data (e.g., of variable length) across nodes in a same network (e.g., as datagrams). Network layer 406 can convert a logical network address to a physical machine address.

A transport layer 408 can manage transmission and receipt quality. Transport layer 408 can provide a protocol for transferring data, such as a Transmission Control Protocol (TCP). Transport layer 408 can perform segmentation/desegmentation of data packets for transmission and can detect and account for transmission errors occurring in layers 402-406. A session layer 410 can initiate, maintain and terminate connections between local and remote applications. Sessions may be used as part of remote-procedure interactions. A presentation layer 412 can encrypt, decrypt and format data based on data types known to be accepted by an application or network layer.

An application layer 414 can interact with software applications that control or manage communications. Via such applications, application layer 414 can (for example) identify destinations, local resource states or availability and/or communication content or formatting. Various layers 402-414 can perform other functions as available and applicable.

Intra-network connection components 422, 424 are shown to operate in physical layer 402 and link layer 404. More specifically, a hub can operate in the physical layer, such that operations can be controlled with respect to receipts and transmissions of communications. Because hubs lack the ability to address communications or filter data, they possess little to no capability to operate in higher levels. Switches, meanwhile, can operate in link layer 404, as they are capable of filtering communication frames based on addresses (e.g., MAC addresses).

Meanwhile, inter-network connection components 426, 428 are shown to operate on higher levels (e.g., layers 406-414). For example, routers can filter communication data packets based on addresses (e.g., IP addresses). Routers can forward packets to particular ports based on the address, so as to direct the packets to an appropriate network. Gateways can operate at the network layer and above, perform similar filtering and directing and further translation of data (e.g., across protocols or architectures).

A connection management system 450 can interact with and/or operate on, in various embodiments, one, more, all or any of the various layers. For example, connection management system 450 can interact with a hub so as to dynamically adjust which terminal devices the hub communicates. As another example, connection management system 450 can communicate with a bridge, switch, router or gateway so as to influence which terminal device the component selects as a destination (e.g., MAC, logical or physical) address. By way of further examples, a connection management system 450 can monitor, control, or direct segmentation of data packets on transport layer 408, session duration on session layer 410, and/or encryption and/or compression on presentation layer 412. In some embodiments, connection management system 450 can interact with various layers by exchanging communications with (e.g., sending commands to) equipment operating on a particular layer (e.g., a switch operating on link layer 404), by routing or modifying existing communications (e.g., between a network device and a terminal device) in a particular manner, and/or by generating new communications containing particular information (e.g., new destination addresses) based on the existing communication. Thus, connection management system 450 can influence communication routing and channel establishment (or maintenance or termination) via interaction with a variety of devices and/or via influencing operating at a variety of protocol-stack layers.

Figure 5:
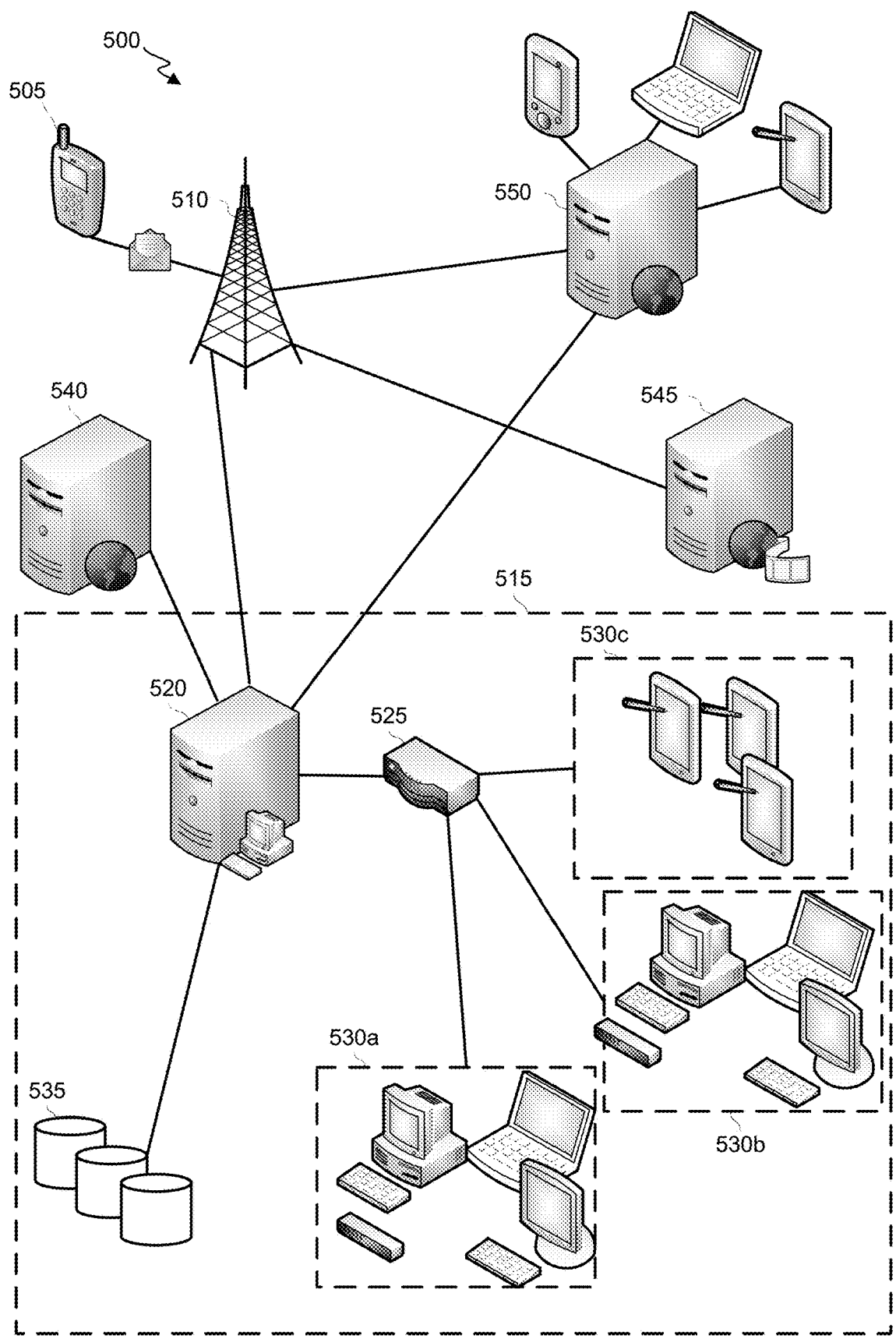
FIG. 5 represents a multi-device communication exchange system according to an embodiment.

FIG. 5 represents a multi-device communication exchange system 500 according to an embodiment. System 500 includes a network device 505 configured to communicate with a variety of types of terminal devices over a variety of types of communication channels.

In the depicted instance, network device 505 can transmit a communication over a cellular network (e.g., via a base station 510). The communication can be routed to an operative network 515. Operative network 515 can include a connection management system 520 that receives the communication and identifies which terminal device is to respond to the communication. Such determination can depend on identifying a client to which that communication pertains (e.g., based on a content analysis or user input indicative of the client) and determining one or more metrics for each of one or more terminal devices associated with the client. For example, in FIG. 5, each cluster of terminal devices 530a-c can correspond to a different client. The terminal devices may be geographically co-located or disperse. The metrics may be determined based on stored or learned data and/or real-time monitoring (e.g., based on availability).

Connection management system 520 can communicate with various terminal devices via one or more routers 525 or other inter-network or intra-network connection components. Connection management system 520 may collect, analyze and/or store data from or pertaining to communications, terminal-device operations, client rules, and/or user-associated actions (e.g., online activity, account data, purchase history, etc.) at one or more data stores. Such data may influence communication routing.

Notably, various other devices can further be used to influence communication routing and/or processing. For example, in the depicted instance, connection management system 520 also is connected to a web server 540. Thus, connection management system 540 can retrieve data of interest, such as technical product details, news, current product offerings, current or predicted weather, and so on.

Network device 505 may also be connected to a web server (e.g., including a streaming web server 545). In some instances, communication with such a server provided an initial option to initiate a communication exchange with connection management system 520. For example, network device 505 may detect that, while visiting a particular webpage, a communication opportunity is available and such an option can be presented.

One or more elements of communication system 500 can also be connected to a social-networking server 550. Social networking server 550 can aggregate data received from a variety of user devices. Thus, for example, connection management system 520 may be able to estimate a general (or user-specific) sentiment towards a given topic or estimate a general behavior of a given user or class of users.

Figure 6:
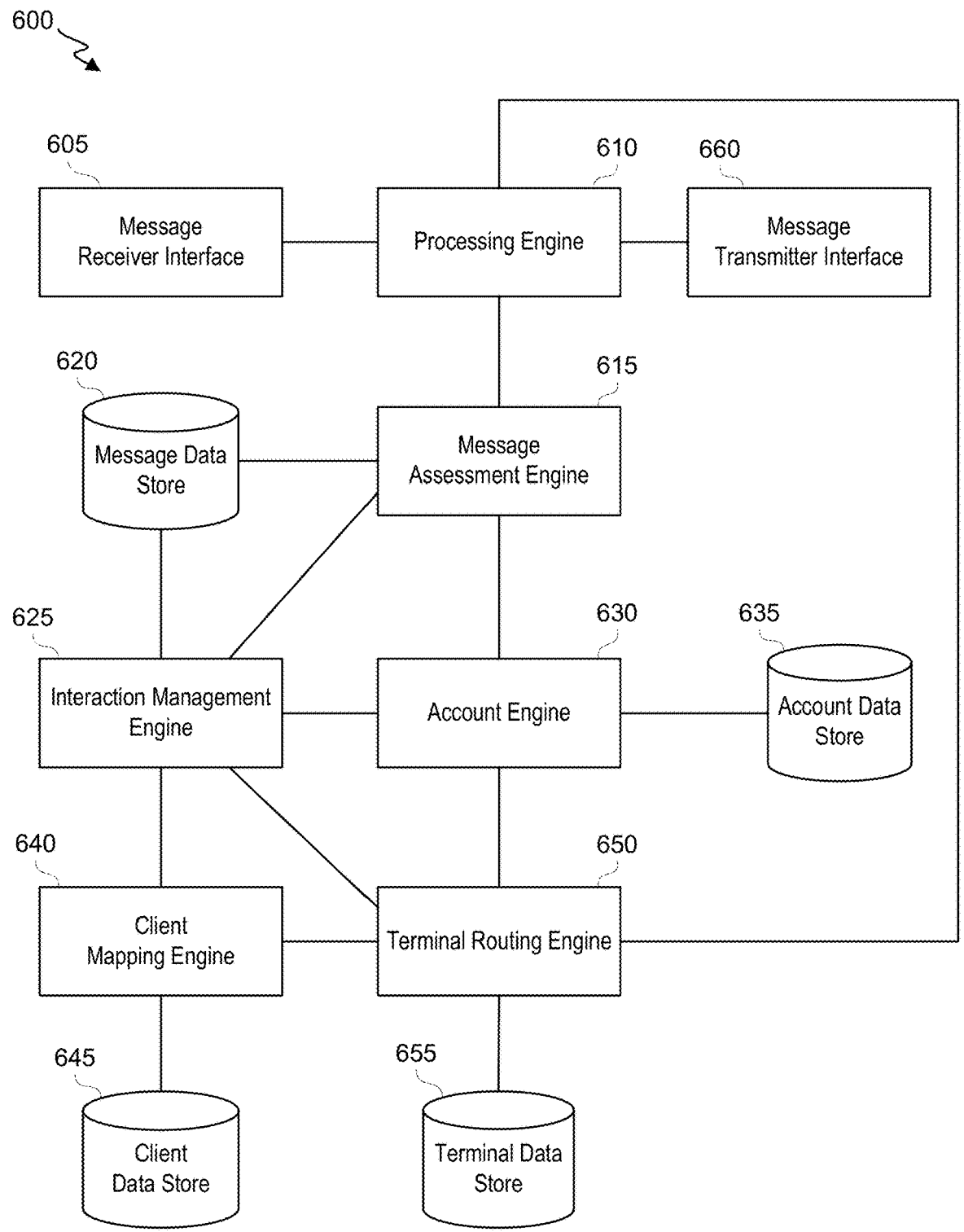
FIG. 6 shows a block diagram of an embodiment of a connection management system.

FIG. 6 shows a block diagram of an embodiment of a connection management system 600. A message receiver interface 605 can receive a message. In some instances, the message can be received, for example, as part of a communication transmitted by a source device (e.g., housed separately from connection management system 600 or within a same housing), such as a network device or terminal device. In some instances, the communication can be part of a series of communications or a communicate exchange, which can include a series of messages or message exchange being routed between two devices (e.g., a network device and terminal device). This message or communication exchange may be part of and/or may define an interaction between the devices. A communication channel or operative channel can include one or more protocols (e.g., routing protocols, task-assigning protocols and/or addressing protocols) used to facilitate routing and a communication exchange between the devices.

In some instances, the message can include a message generated based on inputs received at a local or remote user interface. For example, the message can include a message that was generated based on button or key presses or recorded speech signals. In one instance, the message includes an automatically generated message, such as one generated upon detecting that a network device is presenting a particular app page or webpage or has provided a particular input command (e.g., key sequence). The message can include an instruction or request, such as one to initiate a communication exchange.

In some instances, the message can include or be associated with an identifier of a client. For example, the message can explicitly identify the client (or a device associated with the client); the message can include or be associated with a webpage or app page associated with the client; the message can include or be associated with a destination address associated with a client; or the message can include or be associated with an identification of an item (e.g., product) or service associated with the client (e.g., being offered for sale by the client, having been sold by the client or being one that the client services). To illustrate, a network device may be presenting an app page of a particular client, which may offer an option to transmit a communication to an agent. Upon receiving user input corresponding to a message, a communication may be generated to include the message and an identifier of the particular client.

A processing engine 610 may process a received communication and/or message. Processing can include, for example, extracting one or more particular data elements (e.g., a message, a client identifier, a network-device identifier, an account identifier, and so on). Processing can include transforming a formatting or communication type (e.g., to be compatible with a particular device type, operating system, communication-channel type, protocol and/or network).

A message assessment engine 615 may assess the (e.g., extracted or received) message. The assessment can include identifying, for example, one or more categories or tags for the message. Examples of category or tag types can include (for example) topic, sentiment, complexity, and urgency. A difference between categorizing and tagging a message can be that categories can be limited (e.g., according to a predefined set of category options), while tags can be open. A topic can include, for example, a product, a service, a technical issue, a use question, a complaint, a refund request or a purchase request. A category or tag can be determined, for example, based on a semantic analysis of a message (e.g., by identifying keywords, sentence structures, repeated words, punctuation characters and/or non-article words); user input (e.g., having selected one or more categories); and/or message-associated statistics (e.g., typing speed and/or response latency).

In some instances, message assessment engine 615 can determine a metric for a message. A metric can include, for example, a number of characters, words, capital letters, all-capital words or instances of particular characters or punctuation marks (e.g., exclamation points, question marks and/or periods). A metric can include a ratio, such as a fraction of sentences that end with an exclamation point (or question mark), a fraction of words that are all capitalized, and so on.

Message assessment engine 615 can store a message, message metric and/or message statistic in a message data store 620. Each message can also be stored in association with other data (e.g., metadata), such as data identifying a corresponding source device, destination device, network device, terminal device, client, one or more categories, one or more stages and/or message-associated statistics). Various components of connection management system 600 (e.g., message assessment engine 615 and/or an interaction management engine 625) can query message data store 620 to retrieve query-responsive messages, message metrics and/or message statistics.

An interaction management engine 625 can determine to which device a communication is to be routed and how the receiving and transmitting devices are to communicate. Each of these determinations can depend, for example, on whether a particular network device (or any network device associated with a particular user) has previously communicated with a terminal device in a set of terminal devices (e.g., any terminal device associated with connection management system 600 or any terminal device associated with one or more particular clients).

In some instances, when a network device (or other network device associated with a sane user or account) has previously communicated with a given terminal device (e.g., about matters relating to a client), communication routing can be generally biased towards the same terminal device. Other factors that may influence routing can include, for example, an inferred or identified user or agent sentiment pertaining to the previous communication; a topic of a present communication (e.g., and an extent to which that relates to a topic of a previous communication and/or a knowledge base associated with one or more terminal devices or agents); whether the terminal device (or corresponding agent) is available; and/or a predicted response latency of the terminal device. Such factors may be considered absolutely or relative to similar metrics corresponding to other terminal devices. A re-routing rule (e.g., a client-specific or general rule) can indicate how such factors are to be assessed and weighted to determine whether to forego agent consistency.

When a network device (or other network device associated with a same user or account) has not previously communicated with a given terminal device (e.g., about matters relating to a client), a terminal-device selection can be performed based on factors such as, for example, an extent to which various agents' knowledge base corresponds to a communication topic, availability of various agents at a given time and/or over a channel type, types and/or capabilities of terminal devices (e.g., associated with the client), a language match between a user and agents, and/or a personality analyses. In one instance, a rule can identify how to determine a sub-score to one or more factors such as these and a weight to assign to each score. By combining (e.g., summing) weighted sub-scores, a score for each agent can be determined. A terminal device selection can then be made by comparing terminal devices' scores (e.g., to select a high or highest score).

With regard to determining how devices are to communicate, interaction management engine 625 can (for example) determine whether a terminal device is to respond to a communication via (for example) email, online chat, SMS message, voice call, video chat, etc. A communication type can be selected based on, for example, a communication-type priority list (e.g., at least partly defined by a client or user); a type of a communication previously received from the network device (e.g., so as to promote consistency), a complexity of a received message, capabilities of the network device, and/or an availability of one or more terminal devices. Appreciably, some communication types will result in real-time communication (e.g., where fast message response is expected), while others can result in asynchronous communication (e.g., where delays (e.g., of several minutes or hours) between messages are acceptable).

Further, interaction management engine 625 can determine whether a continuous channel between two devices should be established, used or terminated. A continuous channel can be structured so as to facilitate routing of future communications from a network device to a specified terminal device. This bias can persist even across message series (e.g., days, weeks or months). In some instances, a representation of a continuous channel (e.g., identifying an agent) can be included in a presentation to be presented on a network device. In this manner, a user can understand that communications are to be consistently routed so as to promote efficiency.

In one instance, a score can be generated using one or more factors described herein and a rule (e.g., that includes a weight for each of the one or more factors) to determine a connection score corresponding to a given network device and terminal device. The score may pertain to an overall match or one specific to a given communication or communication series. Thus, for example, the score may reflect a degree to which a given terminal device is predicted to be suited to respond to a network-device communication. In some instances, a score analysis can be used to identify each of a terminal device to route a given communication to and whether to establish, use or terminate a connection channel. When a score analysis is used to both address a routing decision and a channel decision, a score relevant to each decision may be determined in a same, similar or different manner.

Thus, for example, it will be appreciated that different factors may be considered depending on whether the score is to predict a strength of a long-term match versus one to respond to a particular message query. For example, in the former instance, considerations of overall schedules and time zones may be important, while in the latter instance, immediate availability may be more highly weighted. A score can be determined for a single network-device/terminal-device combination, or multiple scores can be determined, each characterizing a match between a given network device and a different terminal device.

To illustrate, a set of three terminal devices associated with a client may be evaluated for potential communication routing. A score may be generated for each that pertains to a match for the particular communication. Each of the first two terminal devices may have previously communicated with a network device having transmitted the communication. An input from the network device may have indicated satisfaction with an interaction with the communication(s) with the first device. Thus, a past-interact sub-score (as calculated according to a rule) for the first, second and third devices may be 10, 5, and 0, respectively. (Negative satisfaction inputs may result in negative sub-scores.) It may be determined that only the third terminal device is immediately available. It may be predicted that the second terminal device will be available for responding within 15 minutes, but that the first terminal device will not be available for responding until the next day. Thus, a fast-response sub-score for the first, second and third devices may be 1, 3 and 10. Finally, it may be estimated a degree to which an agent (associated with the terminal device) is knowledgeable about a topic in the communication. It may be determined that an agent associated with the third terminal device is more knowledgeable than those associated with the other two devices, resulting in sub-scores of 3, 4 and 9. In this example, the rule does not include weighting or normalization parameters (though, in other instances, a rule may), resulting in scores of 14, 11 and 19. Thus, the rule may indicate that the message is to be routed to a device with the highest score, that being the third terminal device. If routing to a particular terminal device is unsuccessful, the message can be routed to a device with the next-highest score, and so on.

A score may be compared to one or more absolute or relative thresholds. For example, scores for a set of terminal devices can be compared to each other to identify a high score to select a terminal device to which a communication can be routed. As another example, a score (e.g., a high score) can be compared to one or more absolute thresholds to determine whether to establish a continuous channel with a terminal device. An overall threshold for establishing a continuous channel may (but need not) be higher than a threshold for consistently routing communications in a given series of messages. This difference between the overall threshold and threshold for determining whether to consistently route communication may be because a strong match is important in the continuous-channel context given the extended utility of the channel. In some embodiments, an overall threshold for using a continuous channel may (but need not) be lower than a threshold for establishing a continuous channel and/or for consistently routing communications in a given series of messages.

Interaction management engine 625 can interact with an account engine 630 in various contexts. For example, account engine 630 may look up an identifier of a network device or terminal device in an account data store 635 to identify an account corresponding to the device. Further, account engine 630 can maintain data about previous communication exchanges (e.g., times, involved other device(s), channel type, resolution stage, topic(s) and/or associated client identifier), connection channels (e.g., indicating— for each of one or more clients— whether any channels exist, a terminal device associated with each channel, an establishment time, a usage frequency, a date of last use, any channel constraints and/or supported types of communication), user or agent preferences or constraints (e.g., related to terminal-device selection, response latency, terminal-device consistency, agent expertise, and/or communication-type preference or constraint), and/or user or agent characteristics (e.g., age, language(s) spoken or preferred, geographical location, interests, and so on).

Further, interaction management engine 625 can alert account engine 630 of various connection-channel actions, such that account data store 635 can be updated to reflect the current channel data. For example, upon establishing a channel, interaction management engine 625 can notify account engine 630 of the establishment and identify one or more of: a network device, a terminal device, an account and a client. Account engine 635 can (in some instances) subsequently notify a user of the channel's existence such that the user can be aware of the agent consistency being availed.

Interaction management engine 625 can further interact with a client mapping engine 640, which can map a communication to one or more clients (and/or associated brands). In some instances, a communication received from a network device itself includes an identifier corresponding to a client (e.g., an identifier of a client, product, service, webpage, or app page). The identifier can be included as part of a message (e.g., which client mapping engine 640 may detect) or included as other data in a message-inclusive communication. Client mapping engine 640 may then look up the identifier in a client data store 645 to retrieve additional data about the client and/or an identifier of the client.

In some instances, a message may not particularly correspond to any client. For example, a message may include a general query. Client mapping engine 640 may, for example, perform a semantic analysis on the message, identify one or more keywords and identify one or more clients associated with the keyword(s). In some instances, a single client is identified. In some instances, multiple clients are identified. An identification of each client may then be presented via a network device such that a user can select a client to communicate with (e.g., via an associated terminal device).

Client data store 645 can include identifications of one or more terminal devices (and/or agents) associated with the client. A terminal routing engine 650 can retrieve or collect data pertaining to each of one, more or all such terminal devices (and/or agents) so as to influence routing determinations. For example, terminal routing engine 650 may maintain a terminal data store 655, which can store information such as terminal devices' device types, operating system, communication-type capabilities, installed applications accessories, geographic location and/or identifiers (e.g., IP addresses). Information can also include agent information, such as experience level, position, skill level, knowledge bases (e.g., topics that the agent is knowledgeable about and/or a level of knowledge for various topics), personality metrics, working hours, language(s) spoken and/or demographic information. Some information can be dynamically updated. For example, information indicating whether a terminal device is available may be dynamically updated based on (for example) a communication from a terminal device (e.g., identifying whether the device is asleep, being turned off/on, idle/active, or identifying whether input has been received within a time period); a communication routing (e.g., indicative of whether a terminal device is involved in or being assigned to be part of a communication exchange); or a communication from a network device or terminal device indicating that a communication exchange has ended or begun.

It will be appreciated that, in various contexts, being engaged in one or more communication exchanges does not necessarily indicate that a terminal device is not available to engage in another communication exchange. Various factors, such as communication types (e.g., message, email, chat, phone), client-identified or user-identified target response times, and/or system loads (e.g., generally or with respect to a user) may influence how many exchanges a terminal device may be involved in.

When interaction management engine 625 has identified a terminal device to involve in a communication exchange or connection channel, it can notify terminal routing engine 650, which may retrieve any pertinent data about the terminal device from terminal data store 655, such as a destination (e.g., IP) address, device type, protocol, etc. Processing engine 610 can then (in some instances) modify the message-inclusive communication or generate a new communication (including the message) so as to have a particular format, comply with a particular protocol, and so on. In some instances, a new or modified message may include additional data, such as account data corresponding to a network device, a message chronicle, and/or client data.

A message transmitter interface 660 can then transmit the communication to the terminal device. The transmission may include, for example, a wired or wireless transmission to a device housed in a separate housing. The terminal device can include a terminal device in a same or different network (e.g., local-area network) as connection management system 600. Accordingly, transmitting the communication to the terminal device can include transmitting the communication to an inter- or intra-network connection component.

Figure 7:
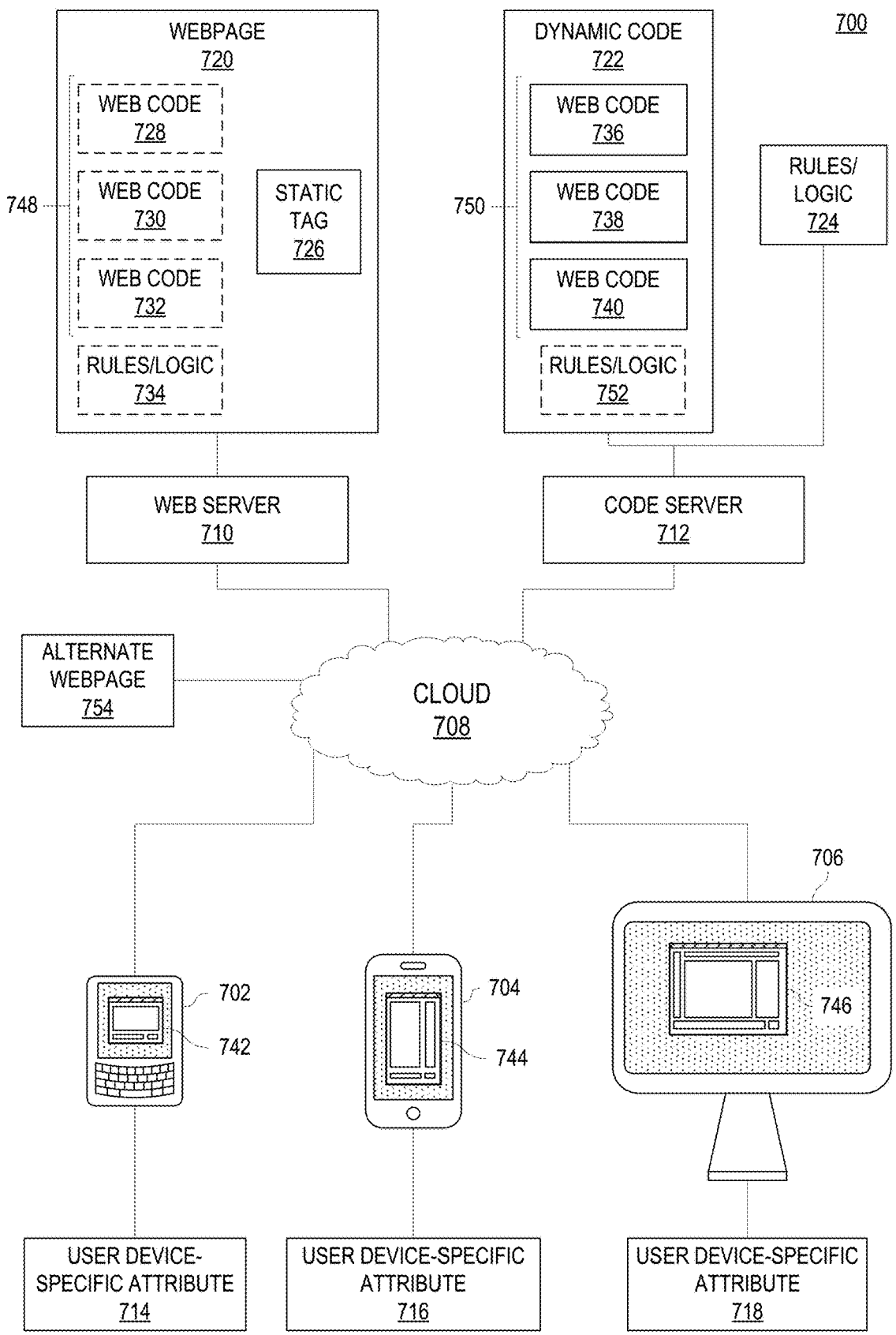
FIG. 7 is a schematic diagram depicting a webpage access environment in which a user device can access a webpage.

FIG. 7 is a schematic diagram depicting a webpage access environment 700 in which a user device 702, 704, 706 can access a webpage 720. In some embodiments, the systems and methods disclosed herein can be used on a webpage access environment 700 that is housed on a single computing device (e.g., a computer that accesses a website located on the computer itself). More commonly, the webpage access environment 700 can include multiple computing devices, and will hereinafter be described in such terms.

A user device 702, 704, 706 can include a first type of mobile phone 702, a second type of mobile phone 704, a desktop computer 706. Other user devices capable of accessing webpages can be used, such as video game consoles, laptops, tablet computers, and any other device capable of accessing and/or loading webpage. The user devices 702, 704, 706 can access a webpage 720 (e.g., by inputting a uniform resource locator (URL) or an Internet Protocol (IP) address) through a cloud 708. The cloud 708 can be any network of computers, including a local area network (LAN) or a wide area network (WAN). In some embodiments, the cloud 708 is the Internet.

The webpage 720 can be stored on a web server 710. The webpage 720 can include HTML elements as well as web code (e.g., JavaScript tags). In some embodiments, the webpage 720 can include a static tag 726. The static tag 726 can include instructions which, when executed by the user device 702, 704, 706 during the loading of the webpage 720, cause the user device 702, 704, 706 to inject dynamic code 722 from a code server 712 into the webpage 720, causing at least a portion of the dynamic code 722 to be executed. The code server 712 can be a separate computer accessible over the cloud 708, or the code server 712 can be the same computer as the web server 710. The dynamic code 722 can include available code 750, which can comprise several pieces of web code 736, 738, 740. A first piece of web code 736 can include the programming necessary to present a first web application 742, a second piece of web code 738 can include the programming necessary to present a second web application 744, and a third piece of web code 740 can include the programming necessary to present a third web application 746. Other numbers of pieces of web code 736, 738, 740 can be used. Each web application 742, 744, 746 can represent a different version of a single web application, such as a version specifically created for a first mobile device 702, a version specifically created for a second mobile device 704, and a version specifically created for a third mobile device 706.

In some embodiments, the static tag 726 can include code which, when executed by the user device 702, 704, 706, causes the user device 702, 704, 706 to access a factor. As described above, the factor can be based on a user device-specific attribute 714, 716, 718, or content from the webpage 720. The static tag 726 can also include one or more rules which, when executed by the user device 702, 704, 706, cause the user device to select a desired web code 736, 738, 740 from the available code 750.

In some embodiments, the dynamic code 722 includes code which, when executed by the user device 702, 704, 706, causes the user device 702, 704, 706 to access a factor. The dynamic code 722 can also optionally include one or more rules which, when executed by the user device 702, 704, 706, cause the user device to select a desired web code 736, 738, 740 from the available code 750.

In some embodiments, the static tag 726 can include code which, when executed by the user device 702, 704, 706, causes the user device 702, 704, 706 to access a factor and transmit that factor to the code server 712. In such embodiments, the code server 712 can evaluate one or more rules 724 based on the factor in order to determine which piece of available code 750 should be executed by the user device accessing the webpage. Based on evaluating the one or more rules 724, the code server 712 can transmit (e.g., inject) dynamic code 722 that contains only the desired web code.

In each embodiment, the user device 702, 704, 706 will only execute the desired web code, and not any other available code 750 that is not evaluated to be desired. For example, when a first type mobile phone 702 accesses and loads the webpage 720, the first type mobile phone 702 can execute code (e.g., in the static tag 726 or in the dynamic code 722) that causes the first type mobile phone 702 to access a user device-specific attribute 714 specific to the first type mobile phone 702. Through any of ways disclosed herein, a rule (e.g., rule 724 or rule 752) can be evaluated (e.g., by the first type mobile phone 702 or by the code server 712) to determine that web code 738 is to be executed by the first type mobile phone 702 in order to present the first web application 742, which has been specifically designed for the first type mobile phone 702. The first type mobile phone 702 can execute the desired web code 738 and the user can be presented with the first web application 742.

When a second type mobile phone 704 accesses and loads the same webpage 720, the second type mobile phone 704 would execute code (e.g., in the static tag 726 or in the dynamic code 722) that causes the second type mobile phone 704 to access a user device-specific attribute 716 specific to the second type mobile phone 704. The rule can be evaluated to determine that web code 740 is to be executed by the second type mobile phone 704 in order to present the second web application 744, which has been specifically designed for the second type mobile phone 704. The second type mobile phone 704 can execute the desired web code 740 and the user can be presented with the second web application 744.

When the desktop computer 706 accesses and loads the same webpage 720, the desktop computer would execute code (e.g., in the static tag 726 or in the dynamic code 722) that causes the desktop computer 706 to access a user device-specific attribute 718 specific to the desktop computer 706. The rule can be evaluated to determine that web code 742 is to be executed by the desktop computer 706 in order to present the third web application 746, which has been specifically designed for the desktop computer 706. The desktop computer 706 can execute the desired web code 740 and the user can be presented with the third web application 746.

In alternate embodiments, the webpage 720 can optionally include available code 748, consisting of pieces of web code 728, 730, 732, as well as rules 734. In such embodiments, a code server 712 may be unnecessary and code injection may be unnecessary. Pieces of web code 728, 730, 732 can be associated with the first, second, and third web applications 742, 744, 746, respectively. As described above, a user device 702, 704, 706 can execute the code built into the webpage 720 in order to evaluate rule 734 and determine which web code 728, 730, 732 of the available code 748 is desired for each particular user device 702, 704, 706.

As described above, the factor evaluated by the rules (e.g., rule 734, rule 752, or rule 724) can be based on content of the webpage 720. In an example, a second type mobile phone 702 can access webpage 720 through web server 710, which includes a static tag 726 that causes the injection of dynamic code 722. The factor that is accessed can be content of webpage 720, which when used in the evaluation of a rule (e.g., rule 752 or rule 724), results in the second type mobile phone 702 executing desired web code 738 associated with the second web application 744. For example, webpage 720 can include content that disables pinch and zoom functionality and the second web application 744 can be specifically designed for websites that have pinch and zoom functionality disabled. In the same example, the second type mobile phone 702 can instead access an alternate webpage 754, which may be located on web server 710 or another web server. The alternate webpage 754 can include the same static tag 726 as used on webpage 720. The alternate webpage 754, however, may be devoid of content which disables pinch and zoom functionality, or may include content which enables pinch and zoom functionality. When a rule (e.g., rule 752 or rule 724) is evaluated based on the same factor, the rule may instead determine that different web code associated with a different web application would be desirable for webpage 754. In such a case, the second type mobile phone 702 would present the different web application, instead of web application 744. In other words, webpage 754 and webpage 720 can be identical except for a single piece of content (e.g., a tag disabling pinch and zoom functionality), and the same user device 702, 704, 706 accessing each webpage 754, 720 could execute a different piece of web code 736, 738, 740 that would result in the presentation of a different web application 742, 744, 746 to a user, all depending on which webpage 754, 720 was accessed.

Figure 8:
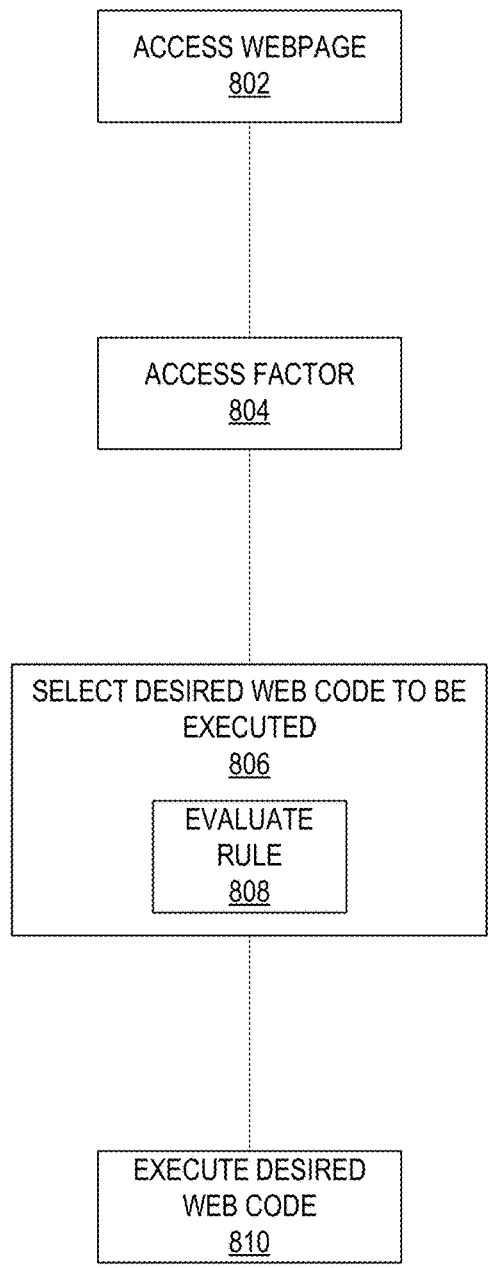
FIG. 8 is a flowchart depicting a method of loading a webpage containing available code according to certain aspects of the present disclosure.

FIG. 8 is a flowchart depicting a method 800 of loading a webpage containing available code according to certain aspects of the present disclosure. At block 802, a webpage is accessed by a user device. The user device can begin loading the webpage. At block 804, the user device can access a factor, such as a user device-specific attribute or an element of the content of the webpage. At block 806, the user device can select desired web code to be executed from available code, which can include evaluating a rule at block 808. Evaluating the rule at block 808 can be based on the factor that is accessed at block 804. At block 810, the user device executes the desired web code.

Figure 9:
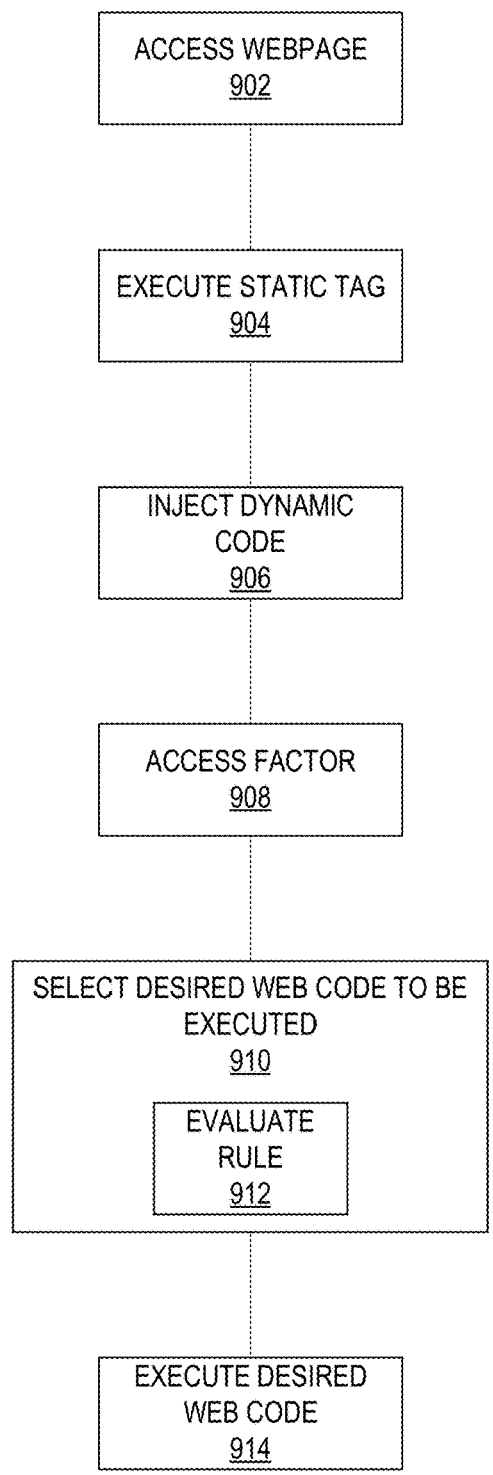
FIG. 9 is a flowchart depicting a method of loading a webpage containing a static tag according to certain aspects of the present disclosure.

FIG. 9 is a flowchart depicting a method 900 of loading a webpage containing a static tag according to certain aspects of the present disclosure. At block 902, a webpage is accessed by a user device. The user device can begin loading the webpage. At block 904, the user device can execute a static tag that causes dynamic code to be injected at block 906. At block 908, the user device can access a factor, such as a user device-specific attribute or an element of the content of the webpage. In some embodiments, accessing the factor at block 908 can occur prior to injecting the dynamic code at block 906. At block 910, the user device can select desired web code to be executed, which can include evaluating a rule at block 912. Evaluating the rule at block 912 can be based on the factor that is accessed at block 908. At block 914, the user device executes the desired web code.

Figure 10:
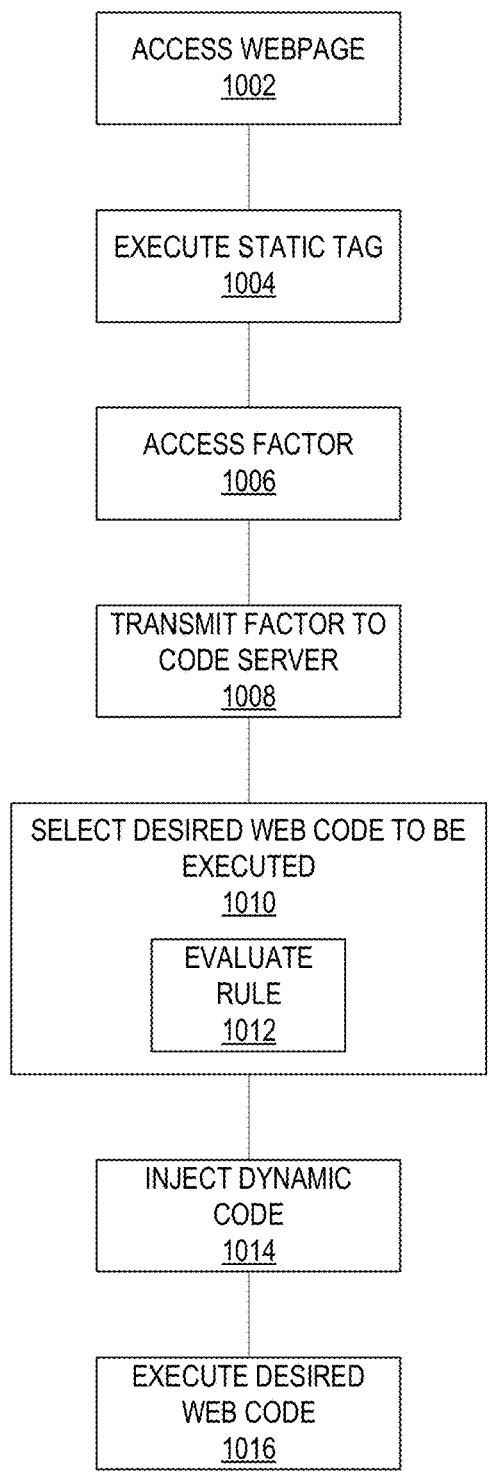
FIG. 10 is a flowchart depicting a method of loading a webpage where code management occurs on a code server according to certain aspects of the present disclosure.

FIG. 10 is a flowchart depicting a method 1000 of loading a webpage where code management occurs on a code server according to certain aspects of the present disclosure. At block 1002, a webpage is accessed by a user device. The user device can begin loading the webpage. At block 1004, the user device can execute a static tag that causes the user device to access a factor at block 1006 and transmit the factor to a code server at block 1008. In some embodiments, accessing the factor at block 1006 can occur prior to executing the static tag at block 1004. At block 1010, the code server can select desired web code to be executed, which can include evaluating a rule at block 1012. Evaluating the rule at block 1012 can be based on the factor that is accessed at block 1006 and transmitted at block 1008. At block 1014, dynamic code from the code server is injected into the webpage being loaded. The dynamic code can include only the desired web code (e.g., no non-desired web code). At block 1016, the user device executes the desired web code by executing the injected dynamic code.

Figure 11:
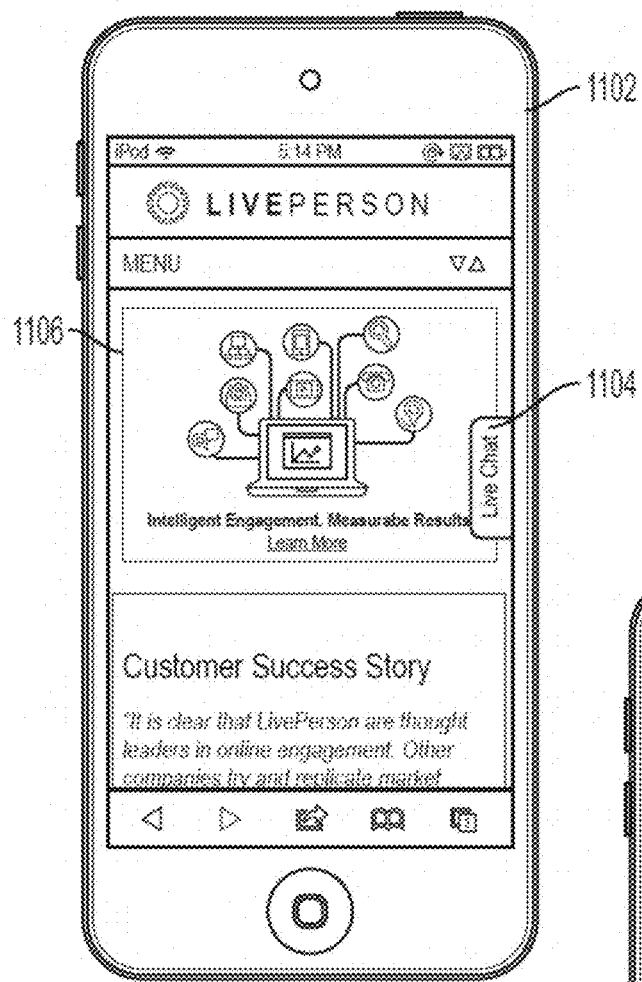
FIG. 11 is an image of a smartphone displaying a webpage according to certain aspects of the present disclosure.

FIG. 11 is an image of a smartphone 1102 displaying a webpage 1106 according to certain aspects of the present disclosure. In loading the webpage 1106, the smartphone 1102 has executed a piece of web code that encodes a web application 1104 present as part of the webpage 1106. As described above, the web application 1104 can be selected based on certain factors, such as factors indicative that the smartphone 1102 is a smartphone mobile device.

Figure 12:
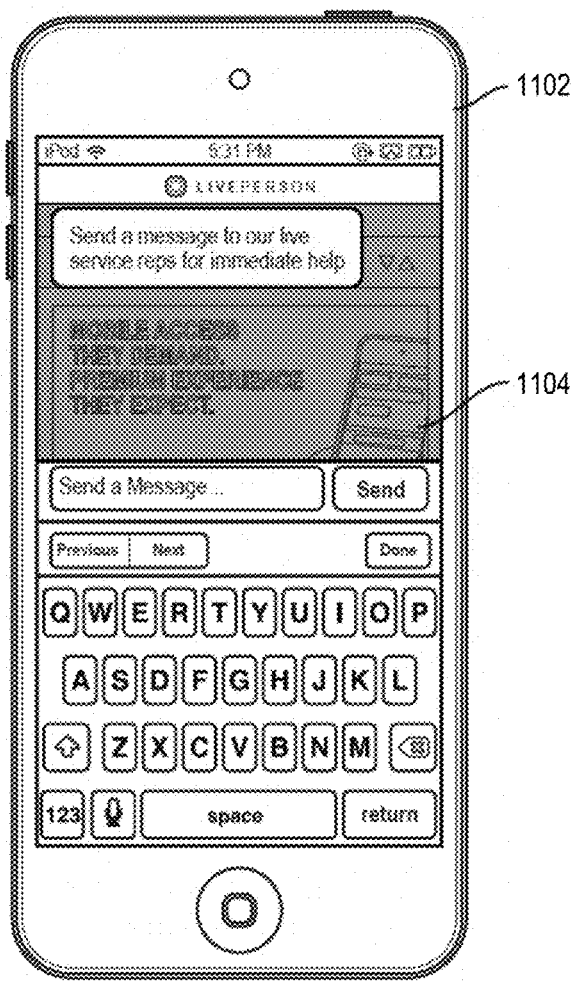
FIG. 12 is an image of the smartphone of FIG. 11 displaying the web application according to certain aspects of the present disclosure.

FIG. 12 is an image of the smartphone 1102 of FIG. 11 displaying the web application 1104 according to certain aspects of the present disclosure.

Figure 13:
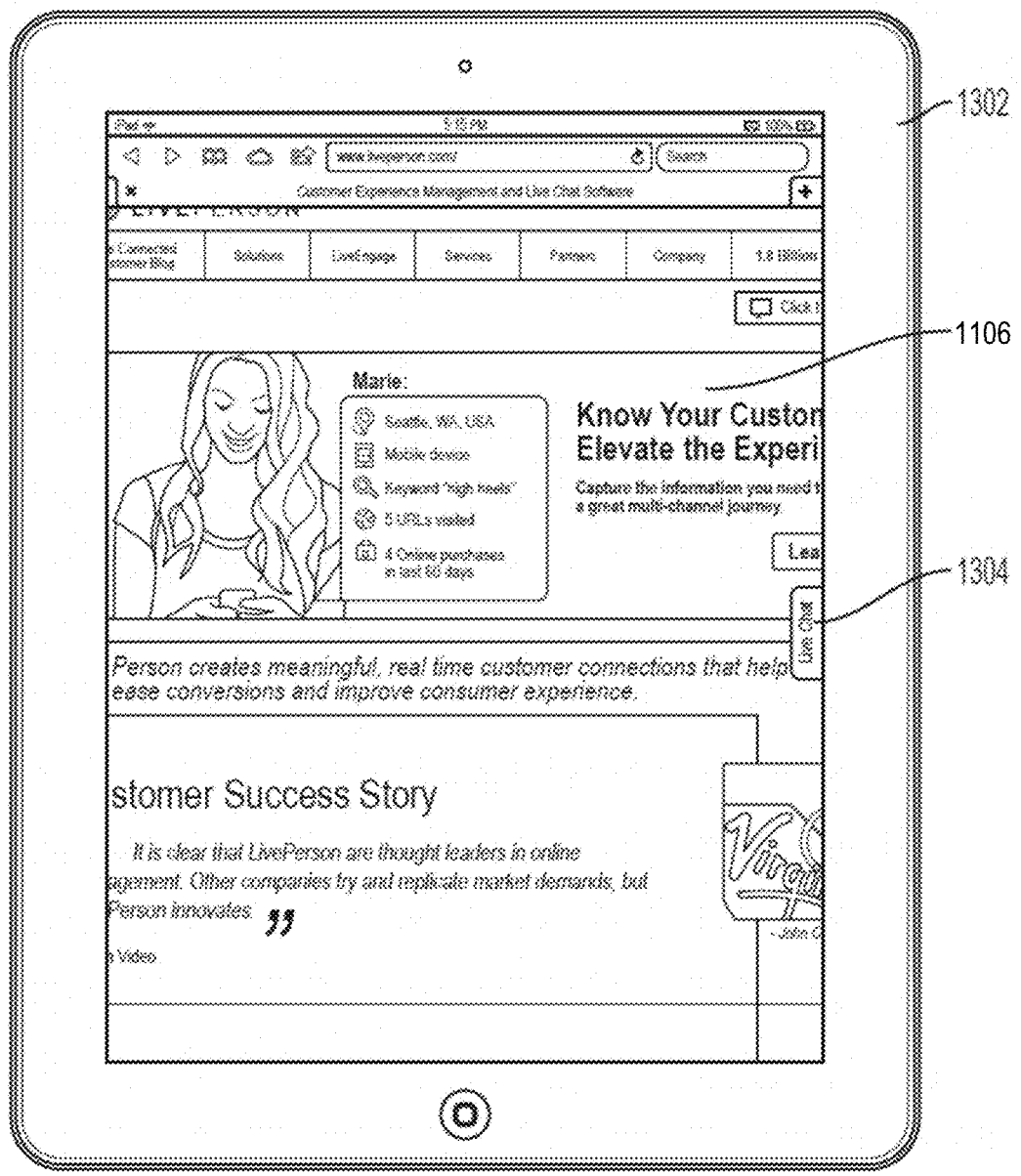
FIG. 13 is an image of a tablet displaying the webpage from FIG. 11 according to certain aspects of the present disclosure.

FIG. 13 is an image of a tablet 1302 displaying the webpage 1106 from FIG. 11 according to certain aspects of the present disclosure. In loading the webpage 1106, the tablet 1302 has executed a piece of web code that encodes a web application 1304 present as part of the webpage 1106. While the webpage 1106 is the same webpage 1106 from FIG. 11, the piece of web code that is executed by the tablet 1302 is different from the piece of web code executed by the smartphone 1102. As described above, the web application 1304 can be selected based on certain factors, such as factors indicative that the tablet 1302 is a tablet mobile device.

Figure 14:
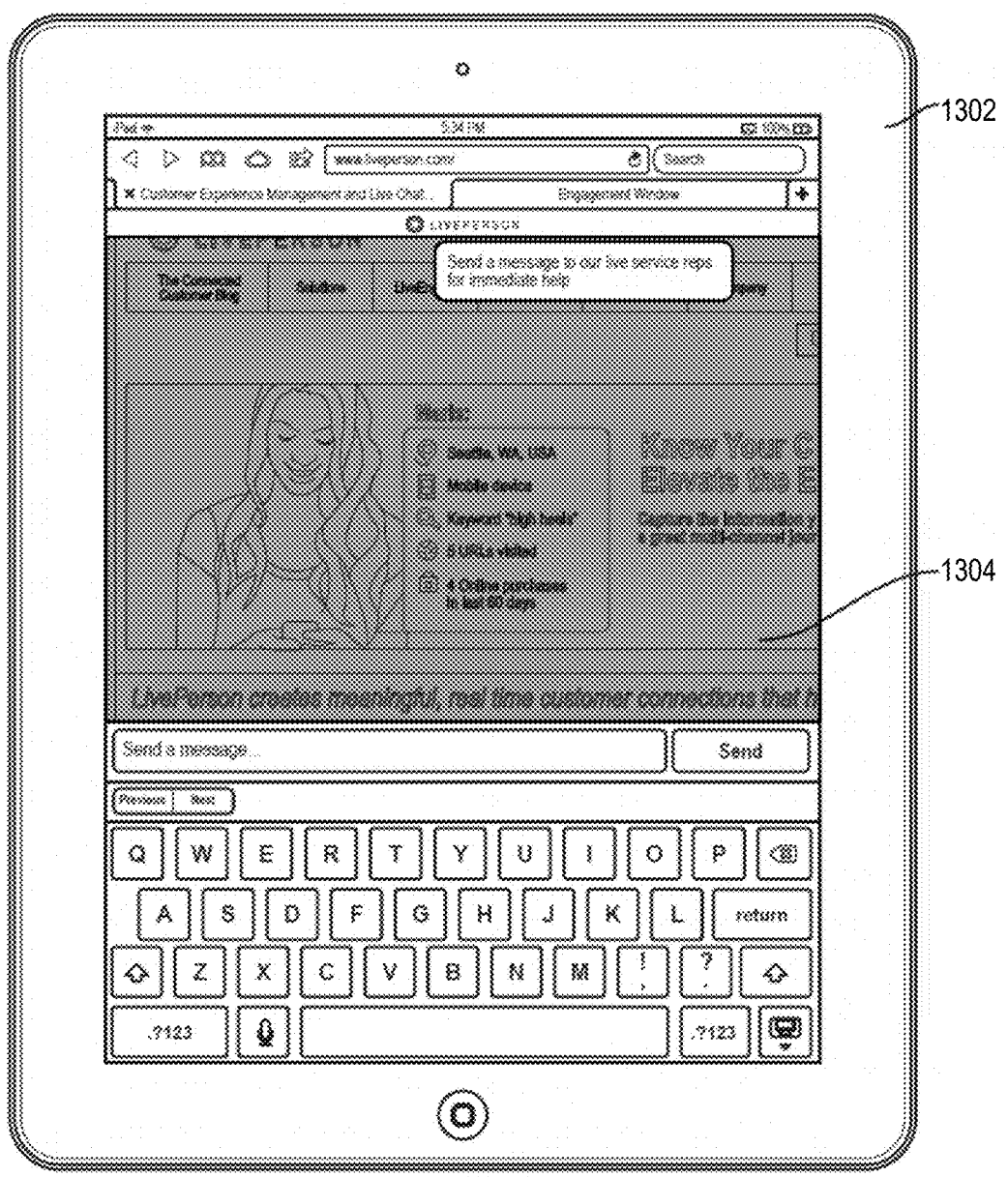
FIG. 14 is an image of the tablet of FIG. 13 displaying the web application according to certain aspects of the present disclosure.

FIG. 14 is an image of the tablet 1302 of FIG. 13 displaying the web application 1304 according to certain aspects of the present disclosure.

Figure 15:
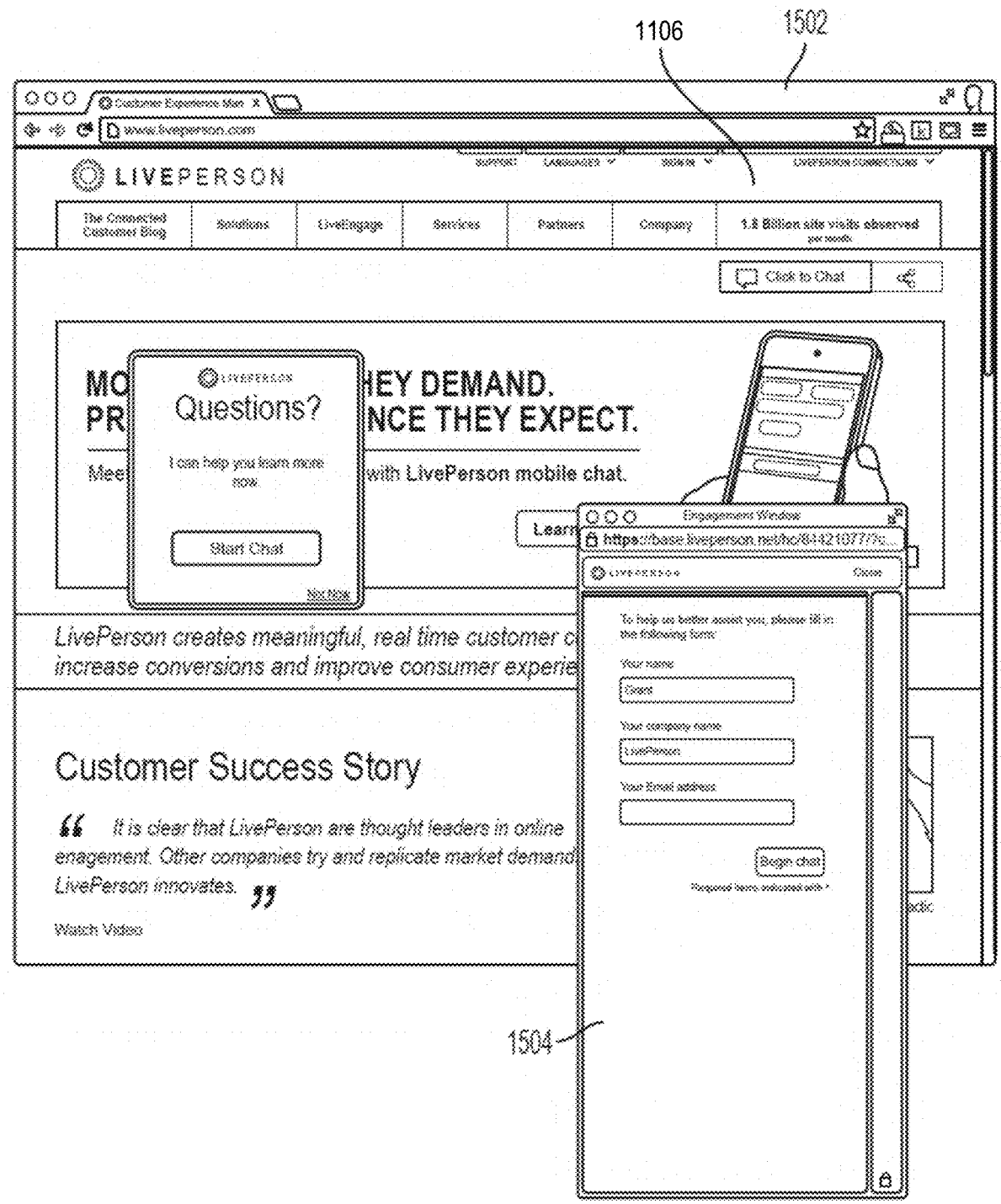
FIG. 15 is an image of a desktop web browser displaying the webpage from FIG. 11 according to certain aspects of the present disclosure.

FIG. 15 is an image of a desktop web browser 1502 displaying the webpage 1106 from FIG. 11 according to certain aspects of the present disclosure. In loading the webpage 1106, the desktop web browser 1502 has executed a piece of web code that encodes a web application 1504 present as part of the webpage 1106. While the webpage 1106 is the same webpage 1106 from FIG. 11, the piece of web code that is executed by the desktop web browser 1502 is different from the piece of web code executed by the smartphone 1102. As described above, the web application 1504 can be selected based on certain factors, such as factors indicative that the desktop web browser 1502 is a browser operating on a desktop computing device.

Figure 16:
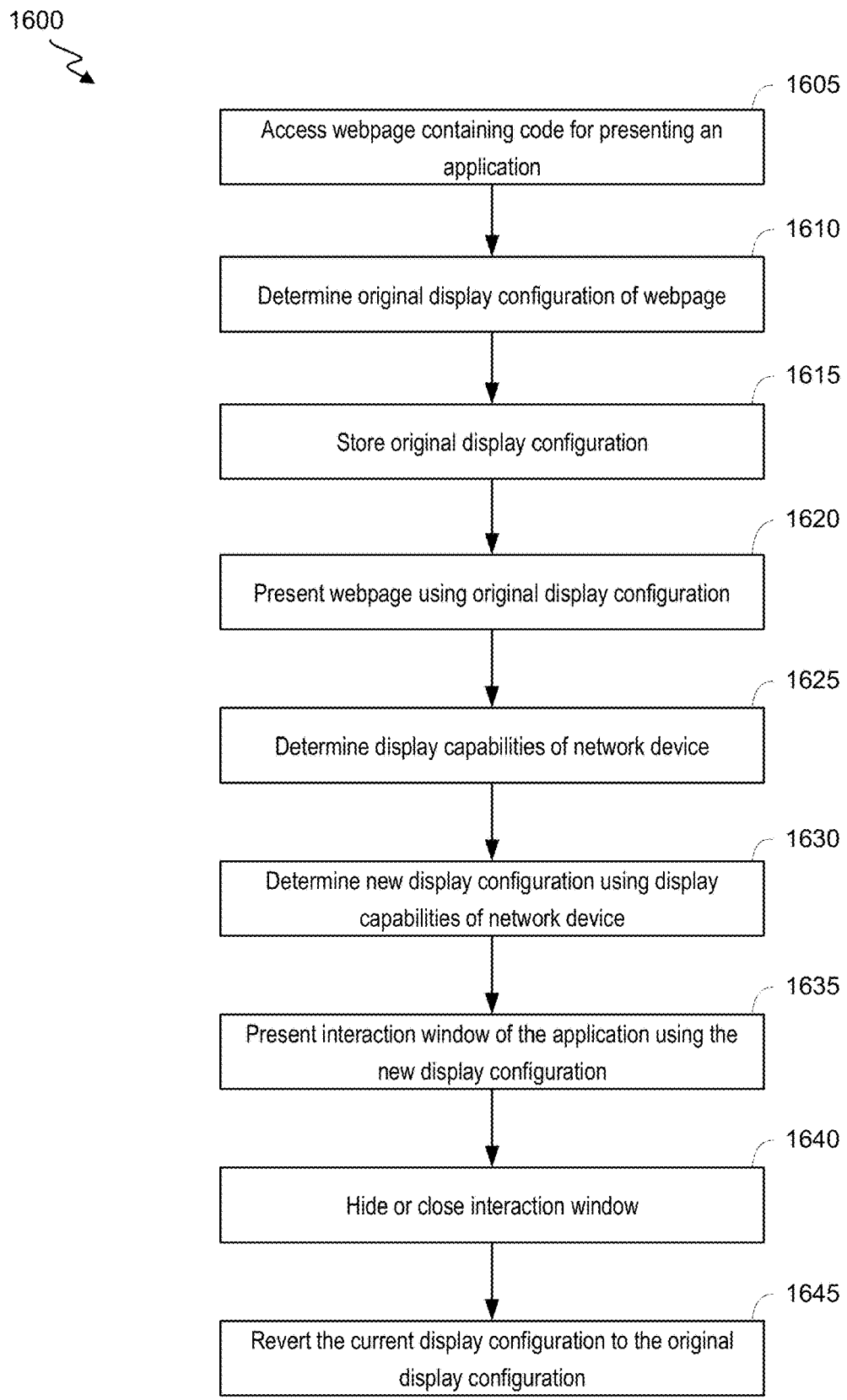
FIG. 16 is a flowchart illustrating a process for presenting interaction windows according to certain aspects of the present disclosure.

FIG. 16 is a flowchart illustrating a process 1600 for presenting interaction windows according to certain aspects of the present disclosure. Process 1600 can be performed, for example, in part or in its entirety by a network device (e.g., computer, smartphone, tablet, or others), such as client device 130, user devices 702, 704, 706, or other suitable devices described herein.

At block 1605, a webpage can be accessed. Accessing the webpage can include requesting the webpage from a remote server (e.g., remote server 140 of FIG. 1). Accessing the webpage can include receiving code for the webpage. The webpage can include code executable to load and run an application on the network device, including code for presenting an interaction window. In some cases, the webpage can include code which when executed, downloads code for loading and running the application. An interaction window can be any interface through which a user can interact with the application. For example, for some communication applications, the interaction window can include or be a chat interface having a chat history element (e.g., collection of one or more past messages between the user and the agent) and a chat input element (e.g., a text box for accepting input from a user which can be used to send a message to an agent). In some cases, the interaction window will not be initially presented (e.g., upon loading the website and/or the application), but will only be presented after a particular input has been received (e.g., after a user presses an engagement button).

At block 1610, the original display configuration of the webpage (e.g., a factor of the website) is determined. The original display configuration can include various information about how the webpage is to be presented on a network device. For example, the original display configuration can include the size, shape, and location of various elements of the webpage; whether the webpage can be zoomed (e.g., "pinch-to-zoom" interactions); the colors used on the webpage; or other configurable display preferences. The original display configuration can be determined by detecting the presence or absence of certain code in the webpage itself or any linked content (e.g., style sheets). For example, the original display configuration can include information that the webpage is to be displayed with the ability to perform "pinch-to-zoom" interactions, which can be determined by reading a viewport tag of the webpage.

At block 1615, the original display configuration is stored. The original display configuration can be stored in memory of the network device. At block 1620, the webpage can be presented using the original display configuration. For example, for a website having the "pinch-to-zoom" interactions enabled through a particular viewport tag, the website can be presented on the network device in such a way that a user can perform "pinch-to-zoom" interactions.

At block 1625, the display capabilities of the network device (e.g., a factor of the network device) can be determined. The display capabilities can include the physical size and/or resolution of the display of the network device. The display capabilities can include any suitable capabilities for the network device to display content, such as other display devices coupled to the network device, the ability for the display of the network device to display colors, or other capabilities. In an example, a tablet device may have a particular resolution; a smartphone device may have a smaller resolution. As determined at block 1625, the display capabilities of a tablet device can include its particular resolution, whereas the display capabilities of a smartphone device can include its particular, smaller resolution.

In some embodiments, determining the display capabilities of a device can include querying the device for its display capabilities. In some embodiments, determining the display capabilities of a device includes determining the model or type of device and accessing an internal or remotely-accessible database containing display capability information searchable by device model or type. For example, the process 1600 can determine that the device on which it is running is a certain model smartphone. The process 1600 can then access a database (e.g., available over the Internet) that contains capability information for many models of smartphone, including the particular one in question.

At block 1630, a new display configuration is determined using the display capabilities of the network device. The new display configuration will be the display configuration used to present the interaction window (e.g., chat window) of the application. The new display configuration can be based on the display capabilities, such as the resolution of the network device's display. The new display configuration can include code to disable the "pinch-to-zoom" interactions or otherwise render the website non-zoomable. For example, the new display configuration can include code to set the viewport tag to render the website non-zoomable.

At block 1635, the interaction window is presented using the new display configuration. The interaction window can be presented, such as by loading and/or displaying the interaction window as part of an HTML tag, such as a Canvas tag, although the interaction window can be loaded and/or displayed in other ways. When the interaction window is presented, the current display configuration can be replaced or changed by the new display configuration. For example, when the interaction window is presented at block 1635, the new display configuration can be used to prohibit zooming on the website that has been loaded, thus preventing zooming of the interaction window itself. In other words, at block 1635, while the interaction window is being presented, the viewport of the website is being dynamically changed to prohibit zooming.

Resolution information from the new display configuration and/or determined display capabilities can be used to set the dimensions (e.g., size) of the elements of the interaction window. Specifically, the elements of the interaction window can be sized such that zooming is unnecessary. Additionally, the size of text or images in the interaction window can be appropriately sized to preclude the need to zoom.

At block 1640, the interaction window can be hidden or closed. When hidden, the same interaction window can be presented again. When closed, the interaction window is unloaded from memory or data presented it the interaction window is cleared from memory.

At block 1645, the current display configuration of the webpage is reverted to the original display configuration stored at block 1615. In some embodiments, no original display configuration is stored at block 1615, and instead the current display configuration is reverted to a default display configuration. In some embodiments, block 1645 occurs when the interaction window is hidden or closed at block 1640.

As a result of process 1600, a webpage having an application with an interaction window (e.g., a chat window) being loaded on several different network devices (e.g., a tablet, a smartphone, and a desktop computer) can be presented with a normal webpage at first which may be zoomable on some devices, but for which zooming may be inhibited while the interaction window is open. For example, when accessing the same webpage, a desktop user may not need to zoom the website while viewing it or while viewing the interaction window; a tablet user may need to zoom the website at times, but when the interaction window is open, the user may be inhibited from zooming the interaction window, which can be presented with the appropriate size for the tablet's display; and a smartphone user may often need to zoom the website, but when the interaction window is open, the smartphone user may be inhibited from zooming the interaction window, which can be presented with the appropriate size for the smartphone's display.

In some embodiments, instructions for performing or instructions enabling the performance of any combination of one or more of blocks 1610, 1615, 1620, 1625, 1630, 1635, 1640, and 1645 can be contained within the code of the webpage, such as within the code of the application. In some embodiments, instructions for performing or instructions enabling the performance of any combination of one or more of blocks 1610, 1615, 1620, 1625, 1630, 1635, 1640, and 1645 can be contained within code linked to by the webpage, such as linked to by the code of the application. In some embodiments, instructions for performing any combination of one or more blocks of process 1600 can be contained within code stored on the network device (e.g., within the web browser, within a separate application, or within an add-on to a web browser or separate application).

Figure 17:
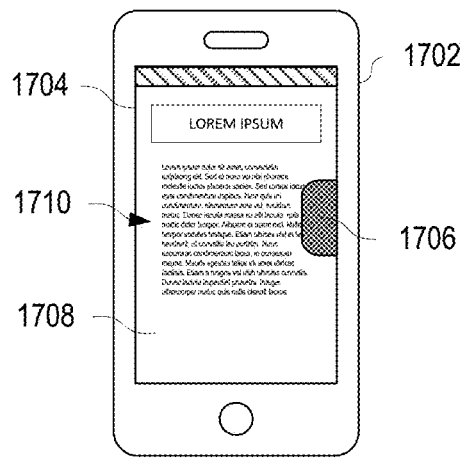
FIG. 17 is a schematic diagram depicting a smartphone accessing a webpage at a first zoom level according to certain aspects of the present disclosure.

FIG. 17 is a schematic diagram depicting a smartphone 1702 accessing a webpage 1708 at a first zoom level according to certain aspects of the present embodiment. The smartphone 1702 can include a display 1704, which can be used to display a webpage 1708. The webpage 1708 is shown having content 1710, such as text. The webpage 1708 can include an application for presenting a chat window. When the webpage 1708 is loaded, it can present a clickable button 1706 that can be used to open the chat window on demand and begin communication with a terminal device.

Figure 18:
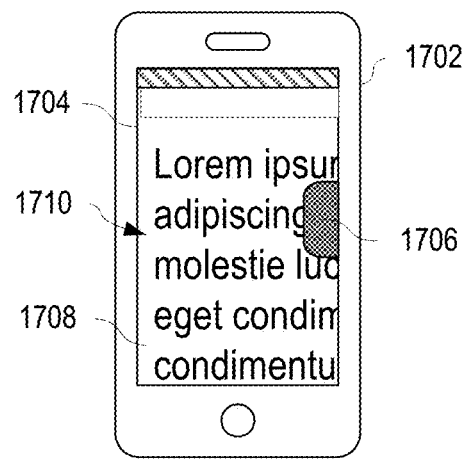
FIG. 18 is a schematic diagram depicting the smartphone of FIG. 17 accessing the webpage at a second zoom level according to certain aspects of the present disclosure.

FIG. 18 is a schematic diagram depicting the smartphone 1702 of FIG. 17 accessing the webpage 1708 at a second zoom level according to certain aspects of the present embodiment. The second zoom level can be achieved by performing a zooming interaction (e.g., a "pinch-to-zoom" interaction, scrolling of a wheel, or other suitable interaction for zooming in or out). At the second zoom level, the content 1710 of the webpage 1708 is increased in size, possibly allowing a user to more easily read or interpret the content 1710. The webpage 1708 may either have a display configuration that specifically permits zooming interactions, or the display configuration of the webpage 1708 may not specifically prohibit zooming interactions, and the web browser installed on the smartphone 1702 may allow zooming interactions by default.

Figure 19:
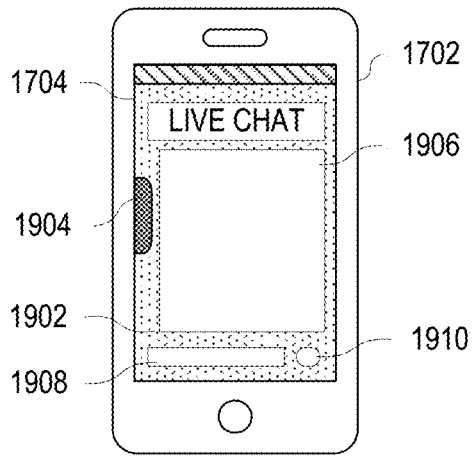
FIG. 19 is a schematic diagram depicting the smartphone of FIG. 17 presenting an interaction window according to certain aspects of the present disclosure.

FIG. 19 is a schematic diagram depicting the smartphone 1702 of FIG. 17 presenting an interaction window 1902 according to certain aspects of the present embodiment. The interaction window 1902 is a chat window in FIG. 19, but could otherwise be any other type of interaction window. The interaction window 1902 can include several elements, including a chat history element 1906, a chat input element 1908, and a send button 1910. The interaction window 1902 can also include a button 1904 for closing and/or hiding the chat window, and thus returning to the underlying webpage 1708. The interaction window 1902 can be displayed over the webpage 1708 as an opaque or translucent window.

The elements of the interaction window 1902 can be sized to completely occupy or mostly occupy the usable space of the display 1704 (e.g., the space that would normally be used by the webpage 1708, which may include all of the display 1704 or a portion of the display 1704). The sizing and location of the elements of the interaction window 1902 can be known as the interaction window layout. The interaction window layout can be determined based on the capabilities of the display 1704 (e.g., the display capabilities determined at block 1625 of FIG. 16). The interaction window layout can be implemented, based on the size and/or resolution of the display 1704, to allow access to all elements of the interaction window without zooming. The interaction window layout can include text sizes, font choices, and other factors that can enhance readability of the content in the interaction window 1902 without zooming.

While the interaction window 1902 is displayed, all zooming interactions can be disabled, thus preventing a user from zooming in or out with regards to the elements of the chat window. The process 1600 of FIG. 16 can be used to disable the zooming interactions, such as by temporarily modifying the display configuration (e.g., the viewport setting) of the webpage to not allow zooming interactions while the interaction window 1902 is displayed. Upon closing or hiding the interaction window 1902, such as by engaging button 1904, the current display configuration can be reverted back to an original display configuration or a default display configuration, thus re-enabling zooming interactions.

The systems, methods, and computer-program products described herein for presenting non-zoomable interaction windows as part of zoomable websites can be used with any of the other aspects disclosed herein, such as to provide communications between users and agents as described herein. The interaction window can be presented on network devices, terminal devices, or client devices. In some embodiments, the display capabilities determined in process 1600 can be used by a connection management system or terminal device to provide enhanced communications between a terminal device and a network device.

Figure 20:
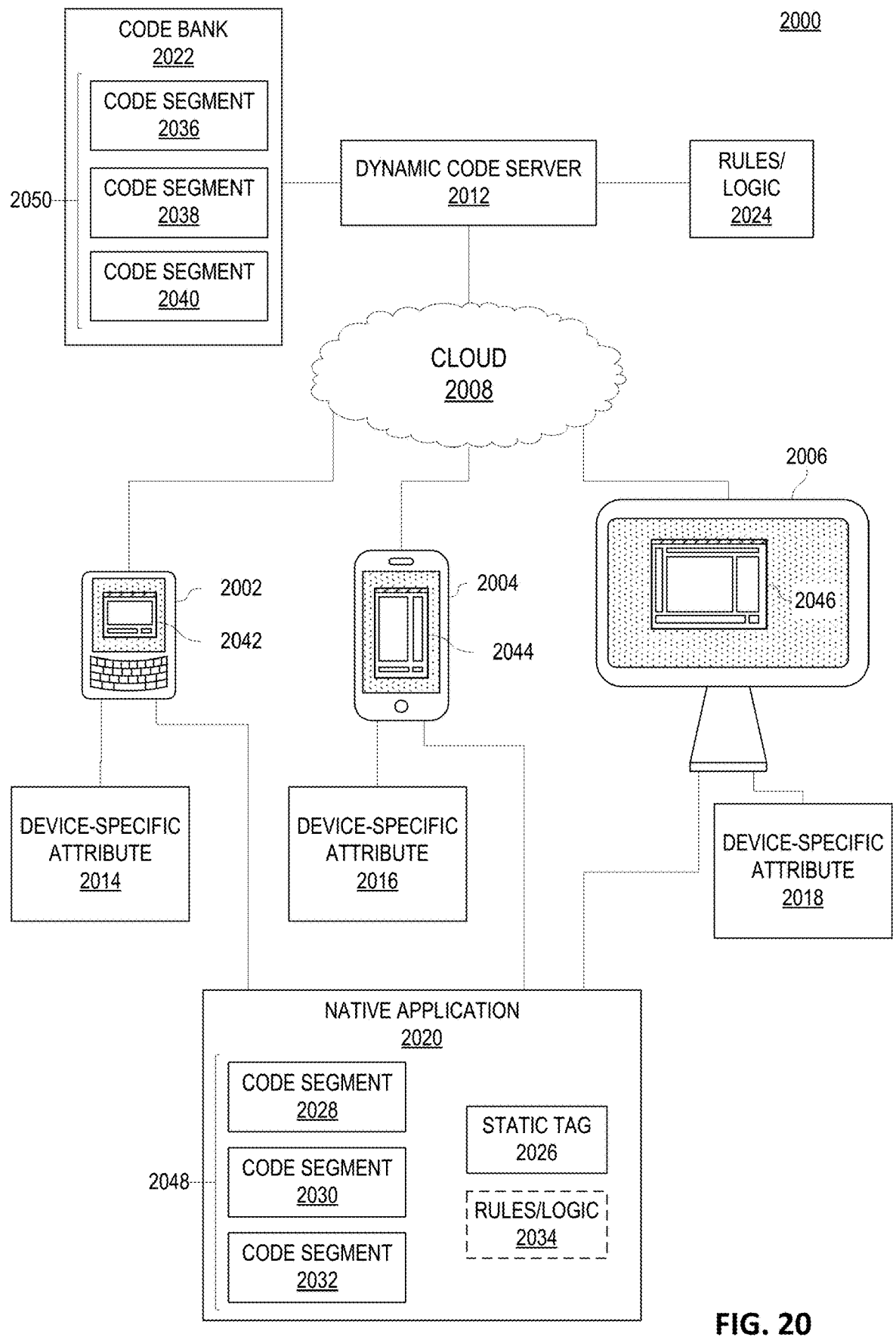
FIG. 20 is a schematic diagram depicting a dynamic native application environment in which a user device can access and execute a native application according to certain aspects of the present disclosure.

FIG. 20 is a schematic diagram depicting a dynamic native application environment 2000 in which a user device 2002, 2004, 2006 can access and execute a native application 2020 according to certain aspects of the present disclosure. The native application 2020 may be universal across all user devices 2002, 2004, 2006 (e.g., device-agnostic), however different versions of the native application 2020 can be deployed depending on the type of device (e.g., depending on the operating system of the device). Native applications 2020 that differ based on type of device (e.g., based on operating system) may nevertheless contain substantially the same methods, subroutines, processes, or other components, with differences only in order to effectuate execution of the same methods, subroutines, processes, or other components on the different types of devices.

User devices 2002, 2004, 2006 can include a first type of mobile phone 2002, a second type of mobile phone 2004, and a desktop computer 2006. Other user devices capable of executing native applications can be used, such as video game consoles, laptops, tablet computers, and wearables (e.g., smart watches). The user devices 2002, 2004, 2006 can run a native application 2020 directly from memory of that particular user device 2002, 2004, 2006. In some cases, a native application 2020 can be accessed through a cloud 2008.

The cloud 2008 can be any network of computers, including a local area network (LAN) or a wide area network (WAN). In some embodiments, the cloud 2008 is the Internet.

The native application 2020 can include a static tag 2026. The static tag 2026 can be any segment of code, which when executed causes the user device 2002, 2004, 2006 to access a factor. The factor can be a device-specific attribute 2014, 2016, 2018 or a portion of content from the native application 2020. For example, a device-specific attribute 2014, 2016, 2018 may be related to a device's screen size, whether a device has a high-speed internet connection, whether a device has a camera, the CPU speed of the device, a model number of the device, or other suitable factors. Examples of a portion of content from the native application 2020 can be the native application's 2020 title, an identifier for the company publishing the native application 2020, a client identifier associated with the native application 2020, a particular portion of the native application 2020 being accessed by a user (e.g., when a user opens a particular page or accesses a particular feature of the native application 2020), or other such information.

In some cases, the native application 2020 can include available code 2048, consisting of code segments 2028, 2030, 2032. Depending on instructions received from a dynamic code server 2012, as described herein, the native application 2020 can be directed to execute one or more of the code segments 2028, 2030, 2032 of the available code 2048. However, absente instruction from the dynamic code server 2012, the native application 2020 may not execute one or more of the code segments 2028, 2030, 2032 of the available code 2048.

In some cases, the native application 2020 can include rules 2034. In some cases, the native application 2020 can apply rules 2034 to the factor in order to determine one or more of the code segments 2028, 2030, 2032 of the available code 2048 to execute without receiving instruction from the dynamic code server 2012. In some cases, the native application 2020 can apply rules 2034 to the instructions from the dynamic code server 2012 to determine one or more of the code segments 2028, 2030, 2032 of the available code 2048 to execute. In some cases, the native application 2020 does not have rules 2034 related to determining execution of any of the available code 2048.

The native application 2020 (e.g., through static tag 2026) can transmit the factor through the cloud 2008 to a dynamic code server 2012 (e.g., a remote server). Upon receiving the factor, the dynamic code server 2012 can access rules 2024 and apply rules 2024 to the factor to evaluate how the native application 2020 should operate. In some cases, the dynamic code server 2012 generates instructions based on the application of the rules 2024 and sends the instructions to the user device 2002, 2004, 2006, which when received, is executed by the native application 2020 and causes one or more of the code segments 2028, 2030, 2032 of the available code 2048 to be executed. In this way, the dynamic code server 2012 is providing a decision to the user device 2002, 2004, 2006 regarding which segment of code to execute.

In some cases, the dynamic code server 2012 can provide the user device 2002, 2004, 2006 with the actual code to execute (e.g., code injection), rather than simply a decision regarding which code to execute. For example, after applying the rule 2024 to the factor, the dynamic code server may access a code bank 2022 to select one or more of the code segments 2036, 2038, 2040 of the available code 2050 in the code bank 2022. The dynamic code server can then transmit the one or more of the code segments 2036, 2038, 2040 as instructions to the user device 2002, 2004, 2006, which can be executed by the native application 2020. In such examples, the native application 2020 may or may not include available code 2048.

In some cases, the instructions from the dynamic code server 2012 (e.g., a decision or code to execute) can include instructions to modify data stored with respect to the native application 2020 (e.g., stored in memory of the user device 2002, 2004, 2006). For example, if an application publisher wants a feature of an application to become available only after a particular event (e.g., after a public announcement of the feature), the publisher can code the feature into the application, but whenever the application is executed, the instructions from the dynamic code server 2012 and/or the rules 2034 in the application itself can deny or otherwise not allow access to the feature (e.g., a rule saying "never allow access"). In some cases, the publisher may not know the exact date of the public announcement when coding the rules 2034 in the application itself. As described herein, once the particular event has occurred or the date when it will occur is known (e.g., Nov. 7, 2016), the publisher can update the rules 2024 of the dynamic code server 2012. Then, the next time the dynamic code server 2012 sends instructions to the user device 2002, 2004, 2006, the instructions can include an update to the rules 2034 (e.g., a rule saying "allow access after Nov. 7, 2016"). Thus, even if the native application 2020 does not have access to the dynamic code server 2012 on Dec. 8, 2016 (e.g., due to lack of internet connection), the updated rules 2034 in the native application 2020 can apply the updated rules 2034 to allow access to the feature. Likewise, the dynamic code server 2012 can be used to update the available code 2048 in the native application 2020. Any updates to the native application 2020 can occur by updating the native application itself or updating data files associated with or accessible to the native application 2020 (e.g., data files stored in other memory accessible to the device).

As described above, different code segments 2036, 2038, 2040 of available code 2050 and code segments 2028, 2030, 2032 of available code 2048 can relate to the presentation of different versions of an application interface 2042, 2044, 2046, respectively (e.g., similar to different versions of a single web application with regard to FIG. 7). The different code segments can also relate to different functionality of the native application 2020 other than its interface.

Figure 21:
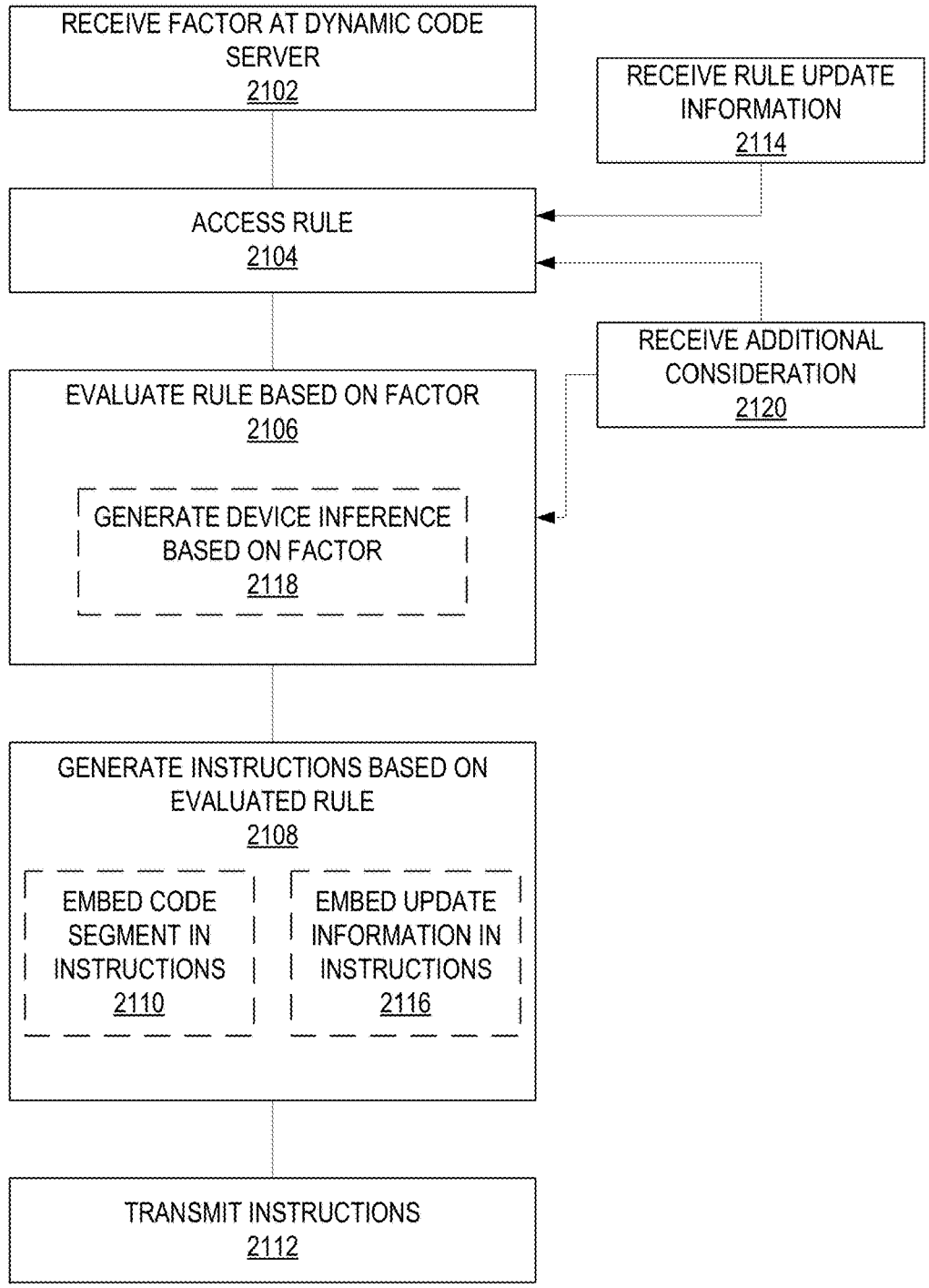
FIG. 21 is a flowchart depicting a method 2100 of dynamic code management for a native application according to certain aspects of the present disclosure.

FIG. 21 is a flowchart depicting a method 2100 of dynamic code management for a native application according to certain aspects of the present disclosure. In some cases, the method 2100 can be used with dynamic code management of web applications as well. At block 2102, a factor is received by a dynamic code server. The factor can be generated at and transmitted by a user device running a native application. The factor can relate to or be indicative of a device-specific attribute or a portion of content of the native application. Receiving the factor can include receiving the factor at a network interface of the dynamic code server (e.g., receiving the factor through a network, such as a cloud or the internet).

At block 2114, a rule can be accessed by the dynamic code server. The rule can be stored on or accessible to the dynamic code server (e.g., via a network). At block 2106, the dynamic code server can evaluate the rule based on the factor. By applying the rule to the factor, the dynamic code server can determine which code segment(s) from all available code should be executed by the native application. Available code can include available code in a code bank accessible to the dynamic code server, available code embedded in or accessible to the native application, or any combination thereof.

At block 2108, the dynamic code server can generate instructions. The instruction can include a determination of which code to execute (e.g., when the code segment to execute is embedded in or accessible to the native application), code itself to be executed (e.g., when the code segment is stored in a code bank accessible to the dynamic code server), or any combination thereof. For example, block 2108 can include optional block 2110 for embedding the code segment into the instructions during generation of the instructions.

At block 2112, the dynamic code server can transmit the instructions. The instructions can be transmitted to the user device, such that when the instructions are received, the native application running on the user device executes the desired code segment. For example, when the instructions are received, the native application can execute a code segment from the available code stored in or accessible to the native application. In another example, when instructions are received, the native application can execute a code segment that has been embedded within the instructions.

At optional block 2114, the dynamic code server can receive rule update information (e.g., from a terminal device). The rule update information can be used to update the rules that are accessible to the dynamic code server. After the rule update information is processed by the dynamic code server, whenever a dynamic code server accesses a rule at block 2104, the rule accessed will be the updated version of the rule.

At optional block 2116, the dynamic code server can embed update information in the instructions. The update information can contain updates to rules or available code embedded in or associated with the native application. When received by a user device, the instructions containing embedded update information can cause the user device to perform updates to the rules or available code embedded in or associated with the native application based on the update information.

At optional block 2118, the dynamic code server can generate a device inference based on the factor. The device inference can be an identity of the device (e.g., device type, manufacturer, or version) or a capability of the device (e.g., having a camera or a fast CPU speed). The inference can be based on the factor. In some cases, the inference can be based on an expected correlation between the factor and the device inference (e.g., an operating system typically run on mobile phones may be a factor used to infer the device has a relatively slow CPU speed). In some cases, the inference can be based on an actual correlation or mapping between the factor and the device inference (e.g., a screen size of 1440 pixels by 1440 pixels can be a factor used to infer the device is a Blackberry Passport). As part of evaluating the rule at block 2106, the device inference can be used to determine which code segments should be executed, and thus how to generate the instructions at block 2108. Additional features and aspects of device inferences are disclosed in further detail below.

At optional block 2120, the dynamic code server can receive an additional consideration. The additional consideration can be any information from a source other than the factor received at block 2102. In some cases, the additional consideration received at block 2120 can be provided to update the rules accessed at block 2104. In some cases, the additional consideration received at block 2120 can be used in the evaluation of the rule at block 2106. In an example, a dynamic code server can evaluate rules to determine which devices should execute code segments for a videoconference interface and which devices should execute code segments for a text-based chat interface. In this example, the factor received at block 2102 can be related to network speed and screen size (e.g., because at too-slow network speeds or too-small screen sizes, videoconferencing may be undesirable). In this example, an additional consideration received at block 2120 can be a number of available agents for videoconferencing. The dynamic code server can then use this additional consideration to help determine on which devices the videoconferencing interface code segment should be executed (e.g., when few agents are available, present videoconferencing only to devices with high connection speeds and large screens, but when many agents are available, present videoconferencing to all devices meeting minimum requirements). The additional consideration can thus be used by the dynamic code server to determine which code segments should be executed, and thus how to generate the instructions at block 2108. Additional features and aspects of the use of additional considerations are disclosed in further detail below.

The following case situations represent examples of ways in which dynamic code management can be used. The following case situations can be used, as suitable, with web application or native applications.

In some cases, a factor that can be used for dynamic code management can include browser type and version, operating system type and version, screen size, whether a device is a mobile device, whether a device has a camera, whether a device has a front-facing camera, whether the device has speakers, whether the device has accelerometers, the amount of battery life remaining in the device, whether the device is coupled to a high-speed network, whether the device has a strong network connection (e.g., high speed, low latency, or low jitter), whether the device is operating on cellular data, whether the device can initiate or receive phone calls, the type and speed of the CPU, the type and speed of the device's GPU, whether the device has GPS capabilities, or any other hardware, software, or other features of the device. In some cases, a factor can include data representative of an environmental condition or stimulus, such as temperature data representative of the device being in a warm climate, altitude data representative of the device being near sea level, or ambient light data representative of the device being outdoors.

In some cases, evaluating a rule (e.g., evaluating rule at block 808 in FIG. 8, evaluating rule at block 912 in FIG. 9, evaluating rule at block 1012 in FIG. 10, or evaluating rule at block 2106 in FIG. 21) can include making an inference. For example, applying a rule to a factor that is representative of a high level of ambient light from a light sensor on the user device can be used to infer that the user device is outdoors. As another example, applying a rule to factors showing a small screen size and a browser version usually run on mobile devices can be used to infer that the user device has a relatively slow CPU speed (e.g., a CPU speed of an average mobile device as opposed to a CPU speed of an average desktop computer). Any number of inferences can be made based on rules. The inferences can then be used to determine which segments of code to run. For example, if an inference is made that the CPU speed of a device is relatively low, a less CPU-intensive version of the application can be run by selecting the necessary code segment(s). Alternatively, if an inference is made that the CPU speed of a device is relatively high, a more CPU-intensive version of the application can be run by selecting the necessary code segments(s).

In some cases, making an inference (e.g., inferring a feature of capability of a device) can include comparing the factor to a set (e.g., database) of known values. For example, a rule can be constructed that, when applied to a factor that is a screen size, looks for a match between the screen size and a device type. For example, upon receiving a factor representing that the screen size of the device is 750 pixels× 1334 pixels, a server can apply a rule to the factor that looks up in a database of screen sizes to determine that the device is or is likely an Apple iPhone 6. Additionally, the rule can make further inferences. For example, if the rule has already inferred that the device is an Apple iPhone 6, the rule can further infer that the device has rear-facing and front-facing cameras, can sense multiple touches (e.g., multi-touch touchscreen), has a dual-core 1.4 GHz Cyclone CPU, has a PowerVR GX6450 GPU, has a microphone and speaker, has the ability to make voice calls, has Bluetooth capabilities, has accelerometers, has GPS capabilities, and other features. The rule can then determine which code segment(s) to have executed based on these inferences.

In some cases, historical data can be collected and used to improve inferences. For example, historical data can include passive or active feedback. For example, an inference can be made that a device has a camera and thus a code segment is executed that presents a videoconference button on the application interface, however the device in fact does not have a camera. If the user never presses the button (e.g., passive feedback) or if the user specifically reports that the device does not have a camera (e.g., active feedback), that data can be stored as historical data and used to improve future inferences. In another example, an inference can be made that a device is a particular type of device, however when prompted for device information at a later time (e.g., during a chat session), the user indicates that the device is a different type of device. This information can be saved as active feedback in order to improve future inferences. In some cases, passive feedback may carry lower weight than active feedback.

In some cases, the different code segments of available code can relate to different versions of an application or different features of an application. For example, upon determining that a device has a front-facing camera, microphone, and speaker, a videoconference feature can be enabled, thus causing the application interface to include a button to initiate a videoconference. In another example, upon determining that a device has multi-touch capabilities, a version of the application taking advantage of multi-touch inputs can be presented, whereas the same application running on a device without multi-touch capabilities may be presented a different version of the application structured specifically for single-touch, mouse, or keyboard input.

In some cases, the factor can be related to the quality of a network connection (e.g., speed, latency, or jitter). The factor can be an actual measurement, such as a speed measurement, or can be an inference source (e.g., a factor indicating the device is connected to a wireless network can be used to infer a high network speed, whereas a factor indicating the device is connected to a cellular network can be used to infer a lower network speed). Different code segments can be selected for execution based on the quality of the network connection. In some cases, an application (e.g., web application or native application) can dynamically change as the factor changes. For example, if a user is using an application while heading home, the user may be operating with a slow cellular data network connection for a while before coming into range of his or her home wireless network, at which point the network connection speed may dramatically increase. In that example, the application can access factors related to quality of the network connection repeatedly or regularly. While operating with the slow cellular data network connection, the user may be presented with a version of the application designed for slower network speeds (e.g., a chat interface with just text). However, upon connecting to the higher speed home wireless network, the application may be dynamically updated (e.g., by receiving code segments or instructions from a remote server) to present a different version (e.g., a chat interface with text and video of an agent).

In some cases, where a remote server (e.g., in the cloud) is used to access and evaluate rules in order to determine which code segments (e.g., accessible by the remote server, accessible by the device, or embedded in or accessible to a native application of device) are to be executed, enhanced customizability is available to website or application publishers and service providers. The rules used by the remote server can be updated at any time and on any schedule, as desired. In the above example where a user coming home is first presented with a text-based chat interface and then, after connecting to a faster network, is presented with a text and video chat interface, the rule accessed by the remote server can be responsible for determining when to present the video of the agent. The application may function as described repeatedly, however if the client or service provide decides they want to disable the video functionality at any point in time (e.g., due to customer feedback, tracking of successful or unsuccessful interactions, or restrictions in bandwidth, such as due to budgeting), the client or service provider can update the rules. Thus, the next time the user starts chatting using the text-based chat and then later connects to his or her faster network, the application will not be dynamically updated to present a video of the agent because the rule evaluated by the remote server has been updated (e.g., to deny the video interfaces and thus no longer have code segments associated with the video interface executed). The same features can apply to various other examples.

In some cases, rules can be dynamically updated (e.g., the rule is updated) or evaluated (e.g., the additional consideration is evaluated along with the factor received from the device) based on additional considerations. For example, if a service provider only has a limited number of agents able to participate in videoconferences, but more agents able to participate in voice or text communications, the service provider may want to offer videoconference capabilities only to a limited number of devices, such as those devices that would be provide the best videoconference experience (e.g., devices with faster CPUs, faster network speeds, larger screen sizes, or other factors). Thus, the number of available videoconference agents can be an additional consideration. Other additional considerations can be used, such as the number of other devices loading a chat application or using a website or native application associated with the chat application. Therefore, every time a device attempts to load a chat application (e.g., web application or native application), the device will transmit one or more factors to a remote server, which will access and evaluate a rule based on the factor and the additional consideration in order to determine whether or not to present a videoconference interface. For example, if the remote server has 100 videoconference agents available, the remote server may determine that a videoconference interface should be presented on any device meeting at least minimum requirements (e.g., a minimum CPU speed, a minimum-speed network connection, and a minimum screen size). However, if the remote server has only three videoconference agents available, the remote server may determine that a videoconference interface should only be presented on devices meeting enhanced threshold requirements (e.g., a relatively high CPU speed, a high-speed network connection, and a large screen size). The additional considerations (e.g., number of videoconference agents available) can be used to update rules themselves or can be used as an input to a rule (e.g., the rule evaluates the factor and the additional consideration).

Specific details are given in the above description to provide a thorough understanding of the embodiments. However, it is understood that the embodiments can be practiced without these specific details. For example, circuits can be shown as block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that portions of the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

As used below, any reference to a series of examples is to be understood as a reference to each of those examples disjunctively (e.g., "Examples 1-4" is to be understood as "Examples 1, 2, 3, or 4").

Example 1 is a computer-implemented method, comprising loading a webpage on a device; accessing a factor when the webpage is loading, wherein factors include a device-specific attribute or content of the webpage; determining a rule; and executing web code selected using the factor and the rule.

Example 2 is the method of example 1, further comprising injecting dynamic code during loading the webpage, wherein the dynamic code includes the desired web code.

Example 3 is the method of example 2, further comprising transmitting the factor to a server, wherein the dynamic code contains the desired web code selected based on the transmitted factor and the rule.

Example 4 is the method of examples 2 or 3, wherein the factor includes customer identification information, and wherein the dynamic code contains the desired web code selected based on the customer identification information.

Example 5 is the method of examples 2-4, wherein the dynamic code includes the rule and a plurality of available code, and wherein the desired web code is selected from the plurality of available code based on the factor and evaluation of the rule on the device.

Example 6 is the method of examples 1-5, wherein the factor is a user agent string, and wherein the desired web code is selected based on the user agent string and the rule.

Example 7 is the method of examples 1-6, wherein the factor is based on the content of the webpage, the content of the webpage including a plurality of webpage elements, and wherein the desired web code is selected based on at least one of the plurality of webpage elements.

Example 8 is the method of examples 1-7, wherein the desired web code is a JavaScript tag.

Example 9 is a system, comprising one or more data processors; and a non-transitory computer-readable storage medium containing instructions which when executed on the one or more data processors, cause the one or more data processors to perform operations including: loading a webpage on a device; accessing a factor when the webpage is loading, wherein factors include a device-specific attribute or content of the webpage; determining a rule; and executing web code selected using the factor and the rule.

Example 10 is the system of example 9, wherein the instructions further cause the one or more data processors to perform additional operations including injecting dynamic code during loading the webpage, wherein the dynamic code includes the desired web code.

Example 11 is the system of example 10, wherein the instructions further cause the one or more data processors to perform the additional operations further including transmitting the factor to a server, and wherein the dynamic code contains the desired web code selected based on the transmitted factor and the rule.

Example 12 is the system of examples 10 or 11, wherein the factor includes customer identification information, and wherein the dynamic code contains the desired web code selected based on the customer identification information.

Example 13 is the system of examples 10-12, wherein the dynamic code includes the rule and a plurality of available code, and wherein the desired web code is selected from the plurality of available code based on the factor and evaluation of the rule on the device.

Example 14 is the system of examples 9-13, wherein the factor is a user agent string, and wherein the desired web code is selected based on the user agent string and the rule.

Example 15 is the system of examples 9-14, wherein the factor is based on the content of the webpage, the content of the webpage including a plurality of webpage elements, and wherein the desired web code is selected based on at least one of the plurality of webpage elements.

Example 16 is the system of examples 9-15, wherein the desired web code is a JavaScript tag.

Example 17 is a computer-program product tangibly embodied in a non-transitory machine-readable storage medium, including instructions configured to cause a data processing apparatus to: load a webpage on a user device; access a factor when the webpage loads, wherein factors include a user device-specific attribute or content of the webpage; determine a rule; and execute web code selected using the factor and the rule.

Example 18 is the computer-program product of example 17, wherein the instructions are further configured to cause the data processing apparatus to inject dynamic code during loading the webpage, wherein the dynamic code includes the desired web code.

Example 19 is the computer-program product of example 18, wherein the instructions are further configured to cause the data processing apparatus to transmit the factor to a server, and wherein the dynamic code contains the desired web code selected based on the transmitted factor and the rule.

Example 20 is the computer-program product of example 18 or 19, wherein the factor includes customer identification information, and wherein the dynamic code contains the desired web code selected based on the customer identification information.

Example 21 is the computer-program product of examples 18-20, wherein the dynamic code includes the rule and a plurality of available code, and wherein the desired web code is selected from the plurality of available code based on the factor and evaluation of the rule on the user device.

Example 22 is the computer-program product of examples 17-21, wherein the factor is a user agent string, and wherein the desired web code is selected based on the user agent string and the rule.

Example 23 is the computer-program product of examples 17-22, wherein the factor is based on the content of the webpage, the content of the webpage including a plurality of webpage elements, and wherein the desired web code is selected based on at least one of the plurality of webpage elements.

Example 24 is the computer-program product of examples 17-23, wherein the desired web code is a JavaScript tag.

Example 25 is a system, comprising one or more data processors; and a non-transitory computer-readable storage medium containing instructions which when executed on the one or more data processors, cause the one or more processors to perform operations including: accessing a webpage, the webpage including code for presenting an interaction window of an application; determining original display configuration information of the webpage, wherein the original display configuration information includes a display setting of the webpage; presenting the webpage using the original display configuration; determining display capabilities of a network device presenting the webpage; determining a new display configuration using the display capabilities of the network device, wherein the new display configuration prohibits zooming interactions; and presenting the interaction window of the application using the new display configuration.

Example 26 is the system of example 25, wherein the operations further include storing the original display configuration information of the webpage; and reverting to the original display configuration when the interaction window is hidden or closed.

Example 27 is the system of examples 25 or 26, wherein the original display configuration includes a viewport setting.

Example 28 is the system of examples 25-27, wherein the application is a chat application, and wherein the interaction window is a chat window having a chat history element and a chat input element.

Example 29 is the system of examples 25-28, wherein determining the new display configuration further includes using the code for presenting the interaction window of the application.

Example 30 is the system of examples 25-29, wherein the operations further include determining an interaction window layout using the display capabilities of the network device, wherein the interaction window layout allows access to all elements of the interaction window without zooming.

What is claimed is:

1. A computer-implemented method, comprising:
   receiving an indication of content associated with a native application executed on a user device, wherein the native application includes a set of available code segments stored in memory of the user device, and wherein the set of available code segments correspond to different versions of an application interface associated with the native application;
   generating a device inference based on the content, wherein the device inference indicates one or more capabilities associated with the user device;
   accessing a set of rules associated with the native application, wherein the set of rules indicates which code segments from the set of available code segments are executable by the native application according to different content associated with the native application;
   identifying one or more code segments based on the content associated with the native application and by applying the device inference to the set of rules, wherein the one or more code segments are identified from the set of available code segments;
   generating decision data, wherein the decision data includes updates to the set of available code segments, and wherein the decision data indicates that the one or more code segments are to be executed by the native application;
   transmitting the decision data, wherein when the decision data is received, the native application performs the updates and executes the one or more code segments to provide a particular version of the application interface through the user device; and
   receiving rule update information corresponding to the set of rules and that defines an updated version of one or more rules from the set of rules, wherein the rule update information is processed to implement the updated version of the one or more rules, and wherein when a new indication of content is received, corresponding code segments are identified from the set of available code segments based on the updated version of the one or more rules.

2. The computer-implemented method of claim 1, wherein the indication is received as a result of execution of a static tag included in the native application, and wherein the static tag causes the native application to provide the indication.

3. The computer-implemented method of claim 1, wherein the content associated with the native application includes a title corresponding to the native application, a client identifier associated with the native application, or a portion of the native application being accessed through the user device.

4. The computer-implemented method of claim 1, wherein the decision data includes executable code that, when executed by the native application, causes the native application to execute the one or more code segments.

5. A system, comprising:
   one or more processors; and
   memory storing thereon instructions that, as a result of being executed by the one or more processors, cause the system to:
   receive an indication of content associated with a native application executed on a user device, wherein the native application includes a set of available code segments stored in memory of the user device, and wherein the set of available code segments correspond to different versions of an application interface associated with the native application;
   generate a device inference based on the content, wherein the device inference indicates one or more capabilities associated with the user device;
   access a set of rules associated with the native application, wherein the set of rules indicates which code segments from the set of available code segments are executable by the native application according to different content associated with the native application;
   identify one or more code segments based on the content associated with the native application and by applying the device inference to the set of rules, wherein the one or more code segments are identified from the set of available code segments;
   generate decision data, wherein the decision data includes updates to the set of available code segments, and wherein the decision data indicates that the one or more code segments are to be executed by the native application;

transmit the decision data, wherein when the decision data is received, the native application performs the updates and executes the one or more code segments to provide a particular version of the application interface through the user device; and receive rule update information corresponding to the set of rules and that defines an updated version of one or more rules from the set of rules, wherein the rule update information is processed to implement the updated version of the one or more rules, and wherein when a new indication of content is received, corresponding code segments are identified from the set of available code segments based on the updated version of the one or more rules.

6. The system of claim 5, wherein the indication is received as a result of execution of a static tag included in the native application, and wherein the static tag causes the native application to provide the indication.

7. The system of claim 5, wherein the content associated with the native application includes a title corresponding to the native application, a client identifier associated with the native application, or a portion of the native application being accessed through the user device.

8. The system of claim 5, wherein the decision data includes executable code that, when executed by the native application, causes the native application to execute the one or more code segments.

9. A non-transitory, computer-readable storage medium storing thereon executable instructions that, as a result of being executed by one or more processors of a computer system, cause the computer system to:

receive an indication of content associated with a native application executed on a user device, wherein the native application includes a set of available code segments stored in memory of the user device, and wherein the set of available code segments correspond to different versions of an application interface associated with the native application;

generate a device inference based on the content, wherein the device inference indicates one or more capabilities associated with the user device;

access a set of rules associated with the native application, wherein the set of rules indicates which code segments from the set of available code segments are executable by the native application according to different content associated with the native application;

identify one or more code segments based on the content associated with the native application and by applying the device inference to the set of rules, wherein the one or more code segments are identified from the set of available code segments;

generate decision data, wherein the decision data includes updates to the set of available code segments, and wherein the decision data indicates that the one or more code segments are to be executed by the native application;

transmit the decision data, wherein when the decision data is received, the native application performs the updates and executes the one or more code segments to provide a particular version of the application interface through the user device; and receive rule update information corresponding to the set of rules and that defines an updated version of one or more rules from the set of rules, wherein the rule update information is processed to implement the updated version of the one or more rules, and wherein when a new indication of content is received, corresponding code segments are identified from the set of available code segments based on the updated version of the one or more rules.

10. The non-transitory, computer-readable storage medium of claim 9, wherein the indication is received as a result of execution of a static tag included in the native application, and wherein the static tag causes the native application to provide the indication.

11. The non-transitory, computer-readable storage medium of claim 9, wherein the content associated with the native application includes a title corresponding to the native application, a client identifier associated with the native application, or a portion of the native application being accessed through the user device.

12. The non-transitory, computer-readable storage medium of claim 9, wherein the decision data includes executable code that, when executed by the native application, causes the native application to execute the one or more code segments.

* * * * *